United States Patent
Sigler et al.

(10) Patent No.: US 10,245,675 B2
(45) Date of Patent: Apr. 2, 2019

(54) MULTI-STAGE RESISTANCE SPOT WELDING METHOD FOR WORKPIECE STACK-UP HAVING ADJACENT STEEL AND ALUMINUM WORKPIECES

(71) Applicant: GM GLOBAL TECHNOLOGY OPERATIONS LLC, Detroit, MI (US)

(72) Inventors: David R. Sigler, Shelby Township, MI (US); Blair E. Carlson, Ann Arbor, MI (US); Michael J. Karagoulis, Okemos, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 377 days.

(21) Appl. No.: 14/883,249

(22) Filed: Oct. 14, 2015

(65) Prior Publication Data

US 2017/0106466 A1    Apr. 20, 2017

(51) Int. Cl.
*B23K 11/20* (2006.01)
*B23K 11/11* (2006.01)
(Continued)

(52) U.S. Cl.
CPC ............ *B23K 11/20* (2013.01); *B23K 11/115* (2013.01); *B23K 11/185* (2013.01); *B23K 11/24* (2013.01); *B23K 2103/20* (2018.08)

(58) Field of Classification Search
CPC ..... B23K 11/20; B23K 11/115; B23K 11/185; B23K 11/24; B23K 11/3009; B23K 2203/20; B23K 11/241; B23K 11/257
(Continued)

(56) References Cited

U.S. PATENT DOCUMENTS 5,302,797 A * 4/1994 Yasuyama ............. B23K 11/115
                                                        219/118
5,783,794 A   7/1998 Oikawa et al.
(Continued)

FOREIGN PATENT DOCUMENTS

CN      1946506       4/2007
CN    102059439       5/2011
(Continued)

OTHER PUBLICATIONS

Wang et al., "Interface microstructure and weld strength of steel/aluminum alloy joints by resistance spot welding," Applied Mechanics and Materials, vols. 117-119 (2012) pp. 1895-1899.
(Continued)

*Primary Examiner* — Brian W Jennison
(74) *Attorney, Agent, or Firm* — Reising Ethington P.C.

(57) ABSTRACT

A workpiece stack-up that includes at least a steel workpiece and an adjacent and overlapping aluminum workpiece can be resistance spot welded by a multi-stage spot welding method. The multi-stage spot welding method involves initially forming a weld joint between the steel and aluminum workpieces. The weld joint extends into the aluminum workpiece from the faying interface of the two workpieces and includes an interfacial weld bond area adjacent to and joined with the faying surface of the steel workpiece. After the weld joint is initially formed, the multi-stage spot welding method calls for remelting and resolidifying at least a portion of the weld joint that includes some or all of the interfacial weld bond area. At least a portion of the resultant refined weld joint may then be subjected to the same remelting and resolidifying practice, if desired. Multiple additional practices of remelting and resolidifying may be carried out.

20 Claims, 7 Drawing Sheets

(51) Int. Cl.
*B23K 11/18* (2006.01)
*B23K 11/24* (2006.01)
*B23K 103/20* (2006.01)

(58) Field of Classification Search
USPC .............................................. 219/118, 86.1
See application file for complete search history.

(56) References Cited

U.S. PATENT DOCUMENTS

| | | | |
|---|---|---|---|
| 6,037,559 A | 3/2000 | Okabe et al. | |
| 7,850,059 B2 | 12/2010 | Kobayashi et al. | |
| 7,935,908 B2 | 5/2011 | Nakagawa et al. | |
| 7,951,465 B2 | 5/2011 | Urushihara et al. | |
| 7,984,840 B2 | 7/2011 | Kobayashi et al. | |
| 8,020,749 B2 | 9/2011 | Kobayashi et al. | |
| 8,058,584 B2 | 11/2011 | Miyamoto et al. | |
| 8,487,206 B2 | 7/2013 | Urushihara et al. | |
| 8,502,105 B2 | 8/2013 | Tanaka et al. | |
| 9,676,065 B2 | 6/2017 | Sigler et al. | |
| 2005/0218121 A1 | 10/2005 | Hayashi et al. | |
| 2005/0247679 A1 | 11/2005 | Wang | |
| 2007/0212565 A1* | 9/2007 | Urushihara | B23K 11/20 428/577 |
| 2009/0255908 A1 | 10/2009 | Sigler et al. | |
| 2011/0097594 A1 | 4/2011 | Tanaka et al. | |
| 2012/0021240 A1* | 1/2012 | Urushihara | B23K 11/115 428/594 |
| 2013/0189023 A1 | 7/2013 | Spinella | |
| 2013/0263638 A1 | 10/2013 | Gugel et al. | |
| 2014/0305912 A1* | 10/2014 | Taniguchi | B23K 11/24 219/91.22 |
| 2014/0360986 A1 | 12/2014 | Sigler et al. | |
| 2015/0053654 A1 | 2/2015 | Sigler et al. | |
| 2015/0053655 A1 | 2/2015 | Sigler et al. | |
| 2015/0083693 A1 | 3/2015 | Schroth et al. | |
| 2015/0096961 A1 | 4/2015 | Carlson et al. | |
| 2015/0096962 A1 | 4/2015 | Sigler et al. | |
| 2015/0231729 A1 | 8/2015 | Yang et al. | |
| 2015/0231730 A1 | 8/2015 | Yang et al. | |
| 2016/0016252 A1 | 1/2016 | Edwards, II | |

FOREIGN PATENT DOCUMENTS

| | | |
|---|---|---|
| CN | 102114574 | 7/2011 |
| JP | 11342477 | 12/1999 |
| JP | 2011224578 | 11/2011 |
| JP | 2013151017 | 8/2013 |

OTHER PUBLICATIONS

Zhang et al., "Effects of resistance spot welding parameters on microstructures and mechanical properties of dissimilar material joints of galvanised high strength steel and aluminum alloy," Science and Technology of Welding Journal, vol. 16 (2011) No. 2 pp. 153-161.

Weihua et al., "Microstructure and mechanical property of resistance spot welded joint of aluminum alloy to high strength steel with especial electrodes," China Welding, vol. 20 (2011) No. 2 pp. 1-6.

Weihua et al., "Interfacial characterization of resistance spot welded joint of steel and aluminum alloy," China Welding, vol. 19 (2010) No. 4 pp. 6-10.

Zhang et al., "Characterization of Intermetallic Compounds in Dissimilar Material Resistance Spot Welded Joint of High Strength Steel and Aluminum Alloy," ISIJ International, vol. 51 (2011) No. 11 pp. 1870-1877.

Choi et al., "A Hybrid Joining Technology for Aluminum/Zinc Coated Steels in Vehicles," J. Mater. Sci. Technol., 2010, 26(9), pp. 858-864.

Hwang et al., "Dissimilar Metal Welding of Steel to Al—Mg Alloy by Spot Resistance Welding," Advanced Materials Research, vols. 15-17 (2007) pp. 381-386.

Imaizumi et al., "Joining Aluminum Automotive Body Alloys to Mild Steel by Resistance Spot Welding," Journal of the Japan Light Metal Welding and Construction Association, vol. 17 (1979) No. 1 pp. 10-17.

Miyamoto et al., "Dissimilar Joining of Aluminum Alloy and Steel by Resistance Spot Welding," SAE Int. J. Mater. Manuf., vol. 2 (2009) Issue 1 pp. 58-67.

Mortazavi et al., "Investigation on Joint Strength of Dissimilar Resistance Spot welds of Aluminum Alloy and Low Carbon Steel," Advanced Materials Research, vols. 264-265 (2011) pp. 384-389.

Qiu et al., "Resistance Spot Welding between Aluminum Alloy and Low-Carbon Steel," Advanced Materials Research, vols. 189-193 (2011) pp. 3534-3540.

Qui et al., "Interfacial microstructure and strength of steel/aluminum alloy joints welded by resistance spot welding with cover plate," Journal of Materials Processing Technology, 209 (2009) pp. 4186-4193.

Ueda et al., "Effects of Zn-Based Alloys Coating on Mechanical Properties and Interfacial Microstructures of Steel/Aluminum Alloy Dissimilar Metals Joints Using Resistance Spot Welding," Materials Transactions, vol. 52 (2011) No. 5 pp. 967-973.

Wang et al., U.S. Appl. No. 14/561,746 entitled "Resistance Spot Welding Steel and Aluminum Workpieces with Electrode Insert," filed Dec. 5, 2014.

Sigler et al., U.S. Appl. No. 14/673,106, entitled "Conical Shaped Current Flow to Facilitate Dissimilar Metal Spot Welding," filed Mar. 30, 2015.

Sigler et al., U.S. Appl. No. 14/722,563 entitled "Resistance Spot Welding Workpiece Stack-Ups of Different Combinations of Steel Workpieces and Aluminum Workpieces," filed May 27, 2015.

Sigler et al., U.S. Appl. No. 14/724,070, entitled "Cover Plate with Intruding Feature to Improve Al-Steel Spot Welding," filed May 28, 2015.

Yang et al., U.S. Appl. No. 14/729,693 entitled "Intruding Feature in Aluminum Alloy Workpiece to Improve Al-Steel Spot Welding," filed Jun. 3, 2015.

Yang et al., U.S. Appl. No. 14/729,656 entitled "Cooling to Control Thermal Stress and Solidification for Welding of Dissimilar Materials," filed Jul. 7, 2015.

English translation of CN 102059439 to Mazda Motor (published May 18, 2011).

English translation of JP 2011224578 to Kobe Steel (published Nov. 10, 2011).

English translation of JP 2013151017 to Mazda Motor (published Aug. 8, 2013).

Haselhuhn et al., U.S. Appl. No. 15/807,219 entitled "Electrode Weld Face Design," filed Nov. 8, 2017.

Sigler et al., U.S. Appl. No. 15/907,996 entitled "Improving Mechanical Performance of Al-Steel Weld Joints by Limiting Steel Sheet Deformation," filed Feb. 28, 2018.

Sigler et al., U.S. Appl. No. 15/920,784 entitled "Resistance Spot Welding Workpiece Stack-Ups Having a Steel Workpiece and an Aluminum Workpiece with a Steel Plate," filed Mar. 14, 2018.

Sigler et al., U.S. Appl. No. 15/976,163 entitled Multi-Step Direct Welding of an Aluminum-Based Workpiece to a Steel Workpiece, filed May 10, 2018.

* cited by examiner

MULTI-STAGE RESISTANCE SPOT WELDING METHOD FOR WORKPIECE STACK-UP HAVING ADJACENT STEEL AND ALUMINUM WORKPIECES

TECHNICAL FIELD

The technical field of this disclosure relates generally to resistance spot welding and, more particularly, to resistance spot welding a steel workpiece and an adjacent overlapping aluminum workpiece.

BACKGROUND

Resistance spot welding is a process used by a number of industries to join together two or more metal workpieces. The automotive industry, for example, often uses resistance spot welding to join together metal workpieces during the manufacture of a vehicle door, hood, trunk lid, lift gate, and/or body structures such as body sides and cross-members, among others. A number of spot welds are typically formed along a peripheral edge of the metal workpieces or some other bonding region to ensure the part is structurally sound. While spot welding has typically been practiced to join together certain similarly composed metal workpieces—such as steel-to-steel and aluminum-to-aluminum—the desire to incorporate lighter weight materials into a vehicle body structure has generated interest in joining steel workpieces to aluminum workpieces by resistance spot welding. The aforementioned desire to resistance spot weld dissimilar metal workpieces is not unique to the automotive industry; indeed, it extends to other industries that may utilize spot welding as a joining process including the aviation, maritime, railway, and building construction industries, among others.

Resistance spot welding, in general, relies on the resistance to the flow of an electrical current through overlapping metal workpieces and across their faying interface(s) to generate heat. To carry out such a welding process, a set of opposed spot welding electrodes is clamped at aligned spots on opposite sides of the workpiece stack-up, which typically includes two or three metal workpieces arranged in lapped configuration, at a predetermined weld site. An electrical current is then passed through the metal workpieces from one welding electrode to the other. Resistance to the flow of this electrical current generates heat within the metal workpieces and at their faying interface(s). When the workpiece stack-up includes a steel workpiece and an adjacent overlapping aluminum workpiece, the heat generated at the faying interface and within the bulk material of those dissimilar metal workpieces initiates and grows a molten aluminum weld pool that extends into the aluminum workpiece from the faying interface. This molten aluminum weld pool wets the adjacent faying surface of the steel workpiece and, upon cessation of the current flow, solidifies into a weld joint that bonds the two workpieces together.

In practice, however, spot welding a steel workpiece to an aluminum workpiece is challenging since a number of characteristics of those two metals can adversely affect the strength—most notably the peel strength—of the weld joint. For one, the aluminum workpiece usually contains one or more mechanically tough, electrically insulating, and self-healing refractory oxide layers on its surface. The oxide layer(s) are typically comprised of aluminum oxides, but may include other metal oxide compounds as well, including magnesium oxides when the aluminum workpiece is composed of a magnesium-containing aluminum alloy. As a result of their physical properties, the refractory oxide layer(s) have a tendency to remain intact at the faying interface where they can hinder the ability of the molten aluminum weld pool to wet the steel workpiece and also provide a source of near-interface defects within the growing weld pool. The insulating nature of the surface oxide layer(s) also raises the electrical contact resistance of the aluminum workpiece—namely, at its faying surface and at its electrode contact point—making it difficult to effectively control and concentrate heat within the aluminum workpiece. Efforts have been made in the past to remove the oxide layer(s) from the aluminum workpiece prior to spot welding. Such removal practices can be impractical, though, since the oxide layer(s) have the ability to regenerate in the presence of oxygen, especially with the application of heat from spot welding operations.

Moreover, in many instances, the persistence and tenacity of the oxide layer(s) are enhanced when an intermediate organic material layer—such as an uncured yet heat-curable adhesive, a sealer, a sound-proofing layer, etc.—is present between the steel and aluminum workpieces at the faying interface. This phenomenon is believed to be caused by residual organic material that is left behind at the weld site after the bulk of the organic material layer is laterally displaced along the faying interface by the clamping pressure of the welding electrodes. The residual organic material is then burned off at the location of the weld joint during current flow. It is believed that carbon residues such as carbon ash, filler particles such as silica and rubber particles, and other derivative materials end up protecting the oxide layer(s) against mechanical break down and dispersion during current flow, thus resulting in oxide layer remnants remaining grouped and compiled at and along the faying interface in a much more disruptive manner as compared to instances in which an intermediate organic material layer is not present between the steel and aluminum workpieces.

In addition to the challenges presented by the one or more oxide layers contained on the aluminum workpiece surfaces, the steel workpiece and the aluminum workpiece also possess different properties that tend to complicate the spot welding process. Specifically, steel has a relatively high melting point (~1500° C.) and relatively high electrical and thermal resistivities, while aluminum has a relatively low melting point (~600° C.) and relatively low electrical and thermal resistivities. As a result of these physical differences, most of the heat is generated within the steel workpiece during current flow. This heat imbalance sets up a temperature gradient between the steel workpiece (higher temperature) and the aluminum workpiece (lower temperature) that initiates rapid melting of the aluminum workpiece. The combination of the temperature gradient created during current flow and the high thermal conductivity of the aluminum workpiece means that, immediately after the electrical current ceases, a situation occurs where heat is not disseminated symmetrically from the weld site. Instead, heat is conducted from the hotter steel workpiece through the aluminum workpiece towards the welding electrode on the other side of the aluminum workpiece, which creates a steep thermal gradient in that direction.

The development of a steep thermal gradient between the steel workpiece and the welding electrode on the other side of the aluminum workpiece is believed to weaken the integrity of the resultant weld joint in two primary ways. First, because the steel workpiece retains heat for a longer duration than the aluminum workpiece after the flow of electrical current has ceased, the molten aluminum weld pool solidifies directionally, starting from the region nearest the colder welding electrode (often water cooled) associated with the aluminum workpiece and propagating towards the faying interface. A solidification front of this kind tends to sweep or drive defects—such as gas porosity, shrinkage voids, micro-cracking, and surface oxide residue—towards and along the faying interface within the weld joint. Second, the sustained elevated temperature in the steel workpiece promotes the growth of brittle Fe—Al intermetallic compounds at and along the faying interface. The intermetallic compounds tend to form thin reaction layers that are generally considered part of the weld joint. Having a dispersion of weld defects together with excessive growth of Fe—Al intermetallic compounds along the faying interface tends to reduce the peel strength of the weld joint.

In light of the aforementioned challenges, previous efforts to spot weld a steel workpiece and an aluminum workpiece have employed a weld schedule that specifies higher currents, longer weld times, or both (as compared to spot welding steel-to-steel), in order to try and obtain a reasonable weld bond area. Such efforts have been largely unsuccessful in a manufacturing setting and have a tendency to damage the welding electrodes. Given that previous spot welding efforts have not been particularly successful, mechanical fasteners such as self-piercing rivets and flow-drill screws have predominantly been used instead. Such mechanical fasteners, however, take longer to put in place and have high consumable costs compared to spot welding. They also add weight to the vehicle body structure—weight that is avoided when joining is accomplished by way of spot welding—that offsets some of the weight savings attained through the use of aluminum workpieces in the first place. Advancements in spot welding that would make the process more capable of joining steel and aluminum workpieces would thus be a welcome addition to the art.

SUMMARY OF THE DISCLOSURE

A method of resistance spot welding a workpiece stack-up that includes at least a steel workpiece and an adjacent overlapping aluminum workpiece includes multiple stages of heating and cooling the stack-up at a weld site. The workpiece stack-up may also include an additional workpiece such as another steel workpiece or another aluminum workpiece so long as the two workpieces of the same base metal composition are disposed next to each other. As such, the workpiece stack-up may include only a steel workpiece and an overlapping aluminum workpiece, or it may include two neighboring steel workpieces disposed adjacent to an aluminum workpiece or two neighboring aluminum workpieces disposed adjacent to a steel workpiece. Additionally, when the workpiece stack-up includes three workpieces, the two workpieces of similar composition may be provided by separate and distinct parts or, alternatively, they may be provided by the same part. An intermediate organic material layer may also optionally be included within the workpiece stack-up between the adjacent and overlapping steel and aluminum workpieces.

The disclosed multi-stage resistance spot welding method produces a refined weld joint between the adjacent steel and aluminum workpieces at their faying interface that joins the two workpieces together. The multi-stage spot welding method includes a weld joint origination stage and one or more weld joint refining stages that are performed in succession after the weld joint origination stage. In the weld joint origination stage, a weld joint is initially formed between the steel and aluminum workpieces. This may be achieved by passing an electrical current through the workpieces and across their faying interface to create a molten aluminum weld pool within the aluminum workpiece, and then reducing current flow to allow the molten aluminum weld pool to cool and solidify. Next, in the weld joint refining stage, at least a portion of the initially formed weld joint at its interfacial weld bond area is remelted and resolidified to form a first refined weld joint. Such remelting and resolidifying may be achieved by passing an electrical current through the workpieces and through the weld joint to remelt at least a portion of the weld joint, followed by reducing current flow to allow the remelted portion to resolidify. This same weld joint refining stage may be performed multiple additional times to eventually produce the final refined weld joint. Indeed, anywhere from one to fifteen weld joint refining stages are preferably executed within the multi-stage spot welding method.

The final refined weld joint produced by the multi-stage spot welding method exhibits good strength, particularly good peel strength, due to the refining effects of the one or more weld joint refining stages. Specifically, it is believed that the remelting and resolidifying that occurs in each of the weld joint refining stages has the effect of reducing the proliferation and/or dissemination of near-interface weld defects such as gas porosity, shrinkage voids, micro-cracking, and surface oxide remnants. This results in cleaner and more consistent bonding between the interfacial weld bond area of the final refined weld joint and the faying surface of the steel workpiece. And cleaner and more consistent bonding results in the final refined weld joint being stronger than the weld joint initially formed in the weld joint origination stage. The strength improvement is particularly noticeable when the workpiece stack-up includes an intermediate organic material layer, such as an uncured yet heat-curable adhesive, between the overlapping faying surfaces of the steel and aluminum workpieces.

DETAILED DESCRIPTION

Figure 1:
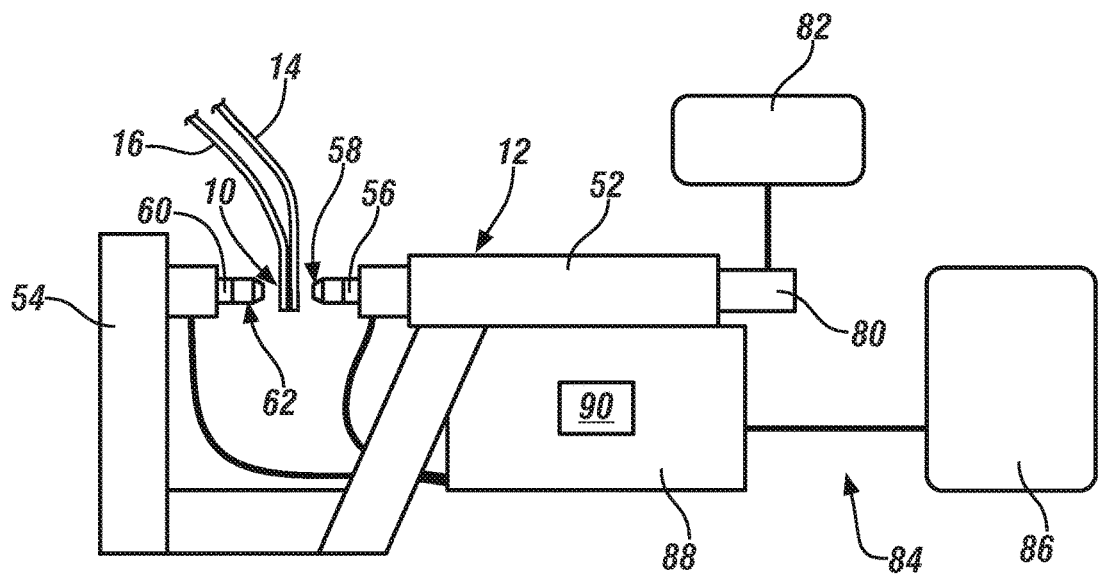
FIG. 1 is a side elevational view of a workpiece stack-up, which includes a steel workpiece and an aluminum workpiece assembled in overlapping fashion, situated between opposed welding electrodes carried on a weld gun in preparation for spot welding according to one embodiment of the disclosure.

Spot welding a workpiece stack-up that includes a steel workpiece and an adjacent overlapping aluminum workpiece presents some notable challenges, as discussed above. The surface oxide layer(s) present on the aluminum workpiece are difficult to breakdown and disintegrate, which, during traditional spot welding techniques, leads to weld defects at the faying interface in the form of micro-cracks and other disparities caused by residual oxides. This is particularly problematic when an intermediate organic material is present between the two workpieces at the faying interface. Moreover, the steel workpiece is more thermally and electrically resistive than the aluminum workpiece, meaning that the steel workpiece acts as a heat source and the aluminum workpiece acts as a heat conductor. The resultant thermal gradient established between the workpieces during and just after cessation of electrical current flow has a tendency to drive gas porosity and other disparities in the molten aluminum weld pool, including the residual oxide defects, towards and along the faying interface, and also contributes to the formation and growth of brittle Fe—Al intermetallic compounds at the faying interface in the form of one or more thin reaction layers.

A multi-stage spot welding method has been devised that counterbalances these challenges and improves the ability to successfully and repeatedly spot weld steel and aluminum workpieces together. The multi-stage spot welding method includes initially forming a weld joint between the adjacent steel and aluminum workpieces (weld joint origination stage). This is accomplished by passing an electrical current through the workpieces and across their faying interface to create a molten aluminum weld pool within the aluminum workpiece, followed by reducing the current flow, and preferably ceasing the current flow altogether, to allow the molten aluminum weld pool to solidify. At this point, especially if an intermediate organic material is present between the adjacent steel and aluminum workpieces, oxide layer remnants and other weld defects may be more prevalent than desired within the weld joint at the faying interface. Such near-interface micro-defects can have an adverse impact on the strength of the weld joint, in particular the peel strength, as well as other structural properties of the joint. The multi-stage spot welding method reduces the adverse effects of these types of weld joint defects by remelting and resolidifying at least a portion of the weld joint at the faying interface (weld joint refining stage) to form a refined weld joint. Such remelting/resolidifying may be performed multiple times to ultimately produce a final refined weld joint.

Preferred and exemplary embodiments of the multi-stage spot welding method are described below with reference to FIGS. 1-15. The disclosed multi-stage spot welding method is broadly applicable to a wide variety of workpiece stack-up configurations that include a steel workpiece disposed adjacent to, and overlapping with, an aluminum workpiece. The workpiece stack-up may include only a steel workpiece and an aluminum workpiece, or, alternatively, it may include an additional steel workpiece (steel-steel-aluminum) or an additional aluminum workpiece (steel-aluminum-aluminum) so long as the two workpieces of the same base metal composition, i.e., aluminum or steel, are disposed next to each other. Furthermore, an intermediate organic material layer may be included between the adjacent steel and aluminum workpieces in the workpiece stack-up, if desired, but it certainly does not have to be. The steel and aluminum workpieces, moreover, may be worked or deformed before or after being assembled into the workpiece stack-up depending on the part being manufactured and the specifics of the overall manufacturing process for that particular part.

Figure 2:
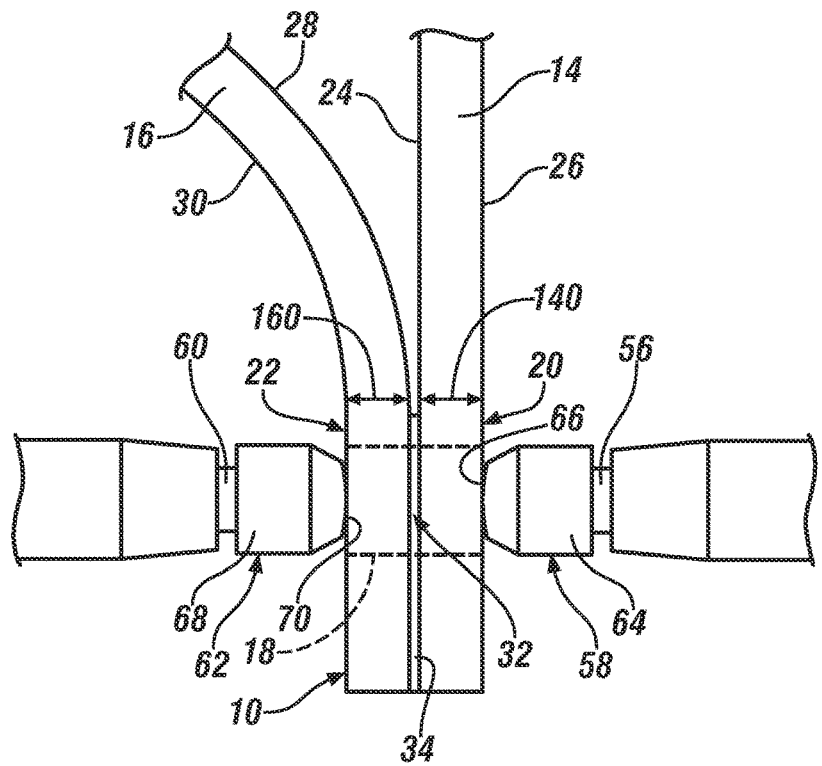
FIG. 2 is a partial magnified view of the workpiece stack-up (shown in cross-section) depicted in FIG. 1 with the welding electrodes carried by the weld gun engaged with opposite sides of the workpiece stack-up.

Referring now to FIGS. 1-2, the workpiece stack-up 10 is shown along with a weld gun 12 that is mechanically and electrically configured to conduct resistance spot welding in accordance with a programmed weld schedule. The workpiece stack-up 10 includes at least a steel workpiece 14 and an aluminum workpiece 16 that overlap at a weld site 18 where spot welding is practiced. The workpiece stack-up 10 has a first side 20 and a second side 22 that are accessible by a set of welding electrodes. Here, in this embodiment, in which the stack-up 10 includes only the two workpieces 14, 16, the steel workpiece 14 provides the first side 20 of the stack-up 10 and the aluminum workpiece 16 provides the second side 22. Embodiments in which the workpiece stack-up 10 includes an additional third workpiece (either steel or aluminum) are described below in connection with FIGS.

3-4. And while only one weld site 18 is depicted in the Figures, skilled artisans will appreciate that spot welding may be practiced at multiple different weld sites on the same stack-up 10.

The steel workpiece includes a steel substrate that may be coated or uncoated (i.e., bare). The coated or uncoated steel substrate may be composed of any of a wide variety of steels including mild steel, interstitial-free steel, bake-hardenable steel, high-strength low-alloy (HSLA) steel, dual-phase (DP) steel, complex-phase (CP) steel, martensitic (MART) steel, transformation induced plasticity (TRIP) steel, twining induced plasticity (TWIP) steel, and press-hardened steel (PHS). And, if coated, the steel substrate preferably includes a surface layer of zinc, zinc-nickel alloy, nickel, aluminum, or aluminum-silicon alloy. The term "steel workpiece" thus encompasses a wide variety of steel substrates, whether coated or uncoated, of different grades and strengths, and further includes those that have undergone pre-welding treatments like annealing, quenching, and/or tempering such as in the production of press-hardened steel. Taking into account the thickness of the steel substrate and any optional coating that may be present, the steel workpiece 14 has a thickness 140 that ranges from 0.3 mm and 6.0 mm, from 0.5 mm to 4.0 mm, or more narrowly from 0.6 mm to 2.5 mm, at least at the weld site 18.

The aluminum workpiece includes an aluminum substrate that is either coated or uncoated (i.e., bare). The aluminum substrate may be composed of elemental aluminum or an aluminum alloy that includes at least 85 wt. % aluminum. Some notable aluminum alloys that may constitute the coated or uncoated aluminum substrate are an aluminum-magnesium alloy, an aluminum-silicon alloy, an aluminum-magnesium-silicon alloy, or an aluminum-zinc alloy. If coated, the aluminum substrate preferably includes a surface layer of its natural refractory oxide layer(s), or, alternatively, it may include a surface layer of zinc, tin, or a metal oxide conversion coating comprised of oxides of titanium, zirconium, chromium, or silicon, as described in US2014/0360986. Taking into account the thickness of the aluminum substrate and any optional coating that may be present, the aluminum workpiece 16 has a thickness 160 that ranges from 0.3 mm to about 6.0 mm, from 0.5 mm to 4.0 mm, and more narrowly from 0.5 mm to 3.0 mm, at least at the weld site 18.

The aluminum substrate may be provided in wrought or cast form. For example, the aluminum substrate may be composed of a 4xxx, 5xxx, 6xxx, or 7xxx series wrought aluminum alloy sheet layer, extrusion, forging, or other worked article. Alternatively, the aluminum substrate may be composed of a 4xx.x, 5xx.x, 6xx.x, or 7xx.x series aluminum alloy casting. Some more specific kinds of aluminum alloys that may constitute the aluminum substrate include, but are not limited to, AA5754 aluminum-magnesium alloy, AA6022 aluminum-magnesium-silicon alloy, AA7003 aluminum-zinc alloy, and Al-10Si-Mg aluminum die casting alloy. The aluminum substrate may further be employed in a variety of tempers including annealed (O), strain hardened (H), and solution heat treated (T), if desired. The term "aluminum workpiece" thus encompasses elemental aluminum and a wide variety of aluminum alloy substrates, whether coated or uncoated, in different spot-weldable forms including wrought sheet layers, extrusions, forgings, etc., as well as castings, and further includes those that have undergone pre-welding treatments such as annealing, strain hardening, and solution heat treating.

When the two workpieces 14, 16 are stacked-up for spot welding in the context of the current embodiment, the steel workpiece 14 includes a faying surface 24 and an exterior outer surface 26 and, likewise, the aluminum workpiece 16 includes a faying surface 28 and an exterior outer surface 30, as shown best in FIG. 2. The faying surfaces 24, 28 of the two workpieces 14, 16 overlap and contact one another to establish a faying interface 32 that extends through the weld site 18. The exterior outer surfaces 26, 30 of the steel and aluminum workpieces 14, 16, on the other hand, generally face away from one another in opposite directions at the weld site 18 and constitute the first and second sides 20, 22 of the workpiece stack-up 10. The distance between the respective faying 24, 28 and exterior outer surfaces 26, 30 of the steel and aluminum workpieces 14, 16 defines the thickness 140, 160 for each of those workpieces 14, 16, as shown in FIG. 2.

The term "faying interface 32" is used broadly in the present disclosure and is intended to encompass instances of direct and indirect contact between the faying surfaces 24, 28 of the workpieces 14, 16. The faying surfaces 24, 28 are in direct contact with each other when they physically abut and are not separated by a discrete intervening material layer. The faying surfaces 24, 28 are in indirect contact with each other when they are separated by a discrete intervening material layer—and thus do not experience the type of extensive interfacial physical abutment found in direct contact—yet are in close enough proximity to each other that resistance spot welding can still be practiced. Indirect contact between the faying surfaces 24, 28 of the steel and aluminum workpieces 14, 16 typically results when an optional intermediate organic material layer 34, as shown in FIG. 2, is disposed between the faying surfaces 24, 28 at least through the weld site 18 prior to welding. The intermediate organic material 34 is relatively thin, usually having a thickness of 0.1 mm to 2.0 mm, which permits spot welding through the layer 34 without much difficulty.

The intermediate organic material layer 34 may be any organic-based material that can be welded through given the clamping force of the welding electrodes and the magnitude and duration of electrical current flow exchanged between the electrodes. For example, the intermediate organic material layer 34 may be an uncured yet heat-curable adhesive. Such an adhesive may be disposed between the faying surfaces 24, 28 of the steel and aluminum workpieces 14, 16 so that, after spot welding, the workpiece stack-up 10 can be heated in an ELPO-bake oven or other device to cure the adhesive and provide additional boding between the workpieces 14, 16. A specific example of a suitable heat-curable adhesive is a heat-curable epoxy that may, but does not necessarily have to, include filler particles, such as silica particles, to modify the viscosity or other mechanical properties of the adhesive when cured. A variety of heat-curable epoxies are commercially available including DOW Betamate 1486, Henkel 5089, and Uniseal 2343. Other types of materials may certainly constitute the intermediate organic material layer 34 in lieu of a heat-curable adhesive. The intermediate organic material layer 34 may, for example, also be a sealer or sound-proofing layer, among other possibilities.

Figure 3:
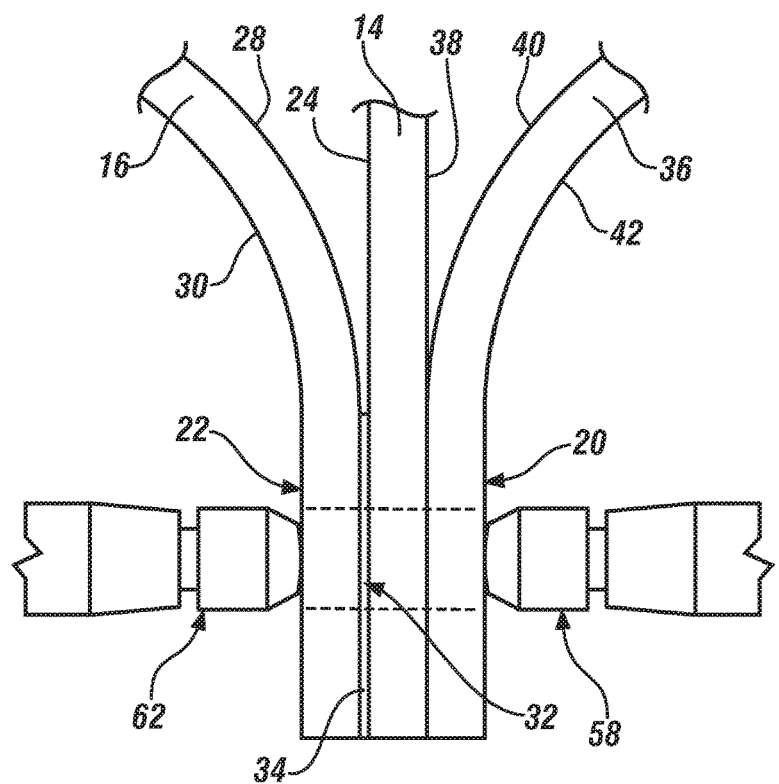
FIG. 3 is a partial magnified view of a workpiece stack-up (shown in cross-section) with the welding electrodes carried by the weld gun shown in FIG. 1 engaged with opposite sides of the workpiece stack-up, although here the workpiece stack-up includes two steel workpieces and one aluminum workpiece according to one embodiment of the disclosure.
Figure 4:
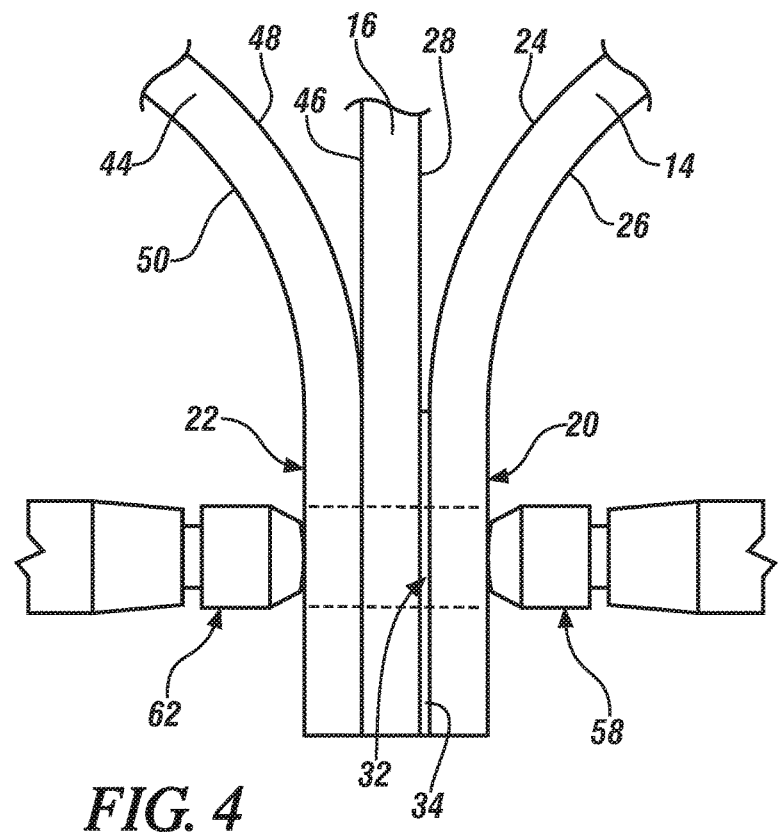
FIG. 4 is a partial magnified view of a workpiece stack-up (shown in cross-section) with the welding electrodes carried by the weld gun shown in FIG. 1 engaged with opposite sides of the workpiece stack-up, although here the workpiece stack-up includes two aluminum workpieces and one steel workpiece according to one embodiment of the disclosure.

Of course, as shown in FIGS. 3-4, the workpiece stack-up 10 is not limited to the inclusion of only the steel workpiece 14 and the adjacent aluminum workpiece 16. The workpiece stack-up 10 may also include an additional steel workpiece or an additional aluminum workpiece—in addition to the adjacent steel and aluminum alloy workpieces 14, 16—so long as the additional workpiece is disposed adjacent to the workpiece 14, 16 of the same base metal composition; that is, any additional steel workpiece is disposed adjacent to the steel workpiece 14 and any additional aluminum workpiece is disposed adjacent to the aluminum workpiece 16. As for the characteristics of any additional workpiece, the descriptions of the steel workpiece 14 and the aluminum workpiece 16 provided above are applicable to any additional steel or aluminum workpiece that may be included in the workpiece stack-up 10. It should be noted, though, that while the same general descriptions apply, there is no requirement that the two steel workpieces or the two aluminum workpieces of a three workpiece stack-up be identical in terms of composition, thickness, or form (e.g., wrought or cast).

As shown in FIG. 3, for example, the workpiece stack-up 10 may include the adjacent steel and aluminum workpieces 14, 16 described above along with an additional steel workpiece 36. Here, as shown, the additional steel workpiece 36 overlaps the adjacent steel and aluminum workpieces 14, 16 and is disposed adjacent to the steel workpiece 14. When the additional steel workpiece 36 is so positioned, the exterior outer surface 30 of the aluminum workpiece 16 provides and delineates the second side 22 of the workpiece stack-up 10, as before, while the steel workpiece 14 that lies adjacent to the aluminum workpiece 16 now includes a pair of opposed faying surfaces 24, 38. The faying surface 24 of the steel workpiece 14 that confronts and contacts (directly or indirectly) the adjacent faying surface 28 of the aluminum workpiece 16 establishes the faying interface 32 between the two workpieces 14, 16 as previously described. The other faying surface 38 of the steel workpiece 14 confronts and makes overlapping contact (direct or indirect) with a faying surface 40 of the additional steel workpiece 36. As such, in this particular arrangement of lapped workpieces 14, 16, 36, an exterior outer surface 42 of the additional steel workpiece 36 now provides and delineates the first side 20 of the workpiece stack-up 10.

In another example, as shown in FIG. 4, the workpiece stack-up 10 may include the adjacent steel and aluminum workpieces 14, 16 described above along with an additional aluminum workpiece 44. Here, as shown, the additional aluminum workpiece 44 overlaps the adjacent steel and aluminum workpieces 14, 16 and is disposed adjacent to the aluminum workpiece 16. When the additional aluminum workpiece 44 is so positioned, the exterior outer surface 26 of the steel workpiece 20 provides and delineates the first side 20 of the workpiece stack-up 10, as before, while the aluminum workpiece 16 that lies adjacent to the steel workpiece 14 now includes a pair of opposed faying surfaces 28, 46. The faying surface 28 of the aluminum workpiece 16 that confronts and contacts (directly or indirectly) the adjacent faying surface 24 of the steel workpiece 14 establishes the faying interface 32 between the two workpieces 14, 16 as previously described. The other faying surface 46 of the aluminum workpiece 16 confronts and makes overlapping contact (direct or indirect) with a faying surface 48 of the additional aluminum workpiece 44. As such, in this particular arrangement of lapped workpieces 14, 16, 44, an exterior outer surface 50 of the additional aluminum workpiece 44 now provides and delineates the second side 22 of the workpiece stack-up 10.

Returning now to the schematic illustration of FIG. 1, the weld gun 12 is shown as part of an automated welding operation within a manufacturing setting. The weld gun 12 may be mounted on a robot positioned in the vicinity of a conveyor or other transport device that is set up to deliver the workpiece stack-up 10 (as well as others like it) to the weld gun 12. The robot may be constructed to move the weld gun 12 along the workpiece stack-up 10 so that a rapid succession of spot welds can be formed at different weld sites 18. The weld gun 12 may also be a stationary pedestal-type weld gun in which the workpiece stack-up 10 is manipulated and moved relative to the weld gun 12 to enable spot welding at different weld sites 18 around the stack-up 10. The weld gun 12 depicted in FIG. 1 is meant to be representative of a wide variety of weld guns, including c-type and x-type weld guns, as well as other weld gun types not specifically mentioned here so long as they are capable of conducting resistance spot welding as called for in the multi-stage spot welding method.

The weld gun 12 includes a first gun arm 52 and a second gun arm 54 that are mechanically and electrically configured to repeatedly form spot welds in accordance with the prescribed weld schedule. The first gun arm 52 is fitted with a first shank 56 that retains a first welding electrode 58, and the second gun arm 54 is fitted with a second shank 60 that retains a second welding electrode 62. Each of the first and second welding electrodes 58, 62 is formed from an electrically conductive material and may assume any of a wide variety of constructions that are capable of exchanging electrical current under an applied compressive force and carrying out the multi-stage spot welding method. Some examples of suitable designs for the first and second welding electrodes 58, 62 are described below. Additionally, a mechanism for supplying the first and second welding electrodes 58, 62 with a cooling fluid, such as water, may be incorporated into the weld gun 12 to keep the first and welding electrodes 58, 62 from overheating during spot welding.

Figure 5:
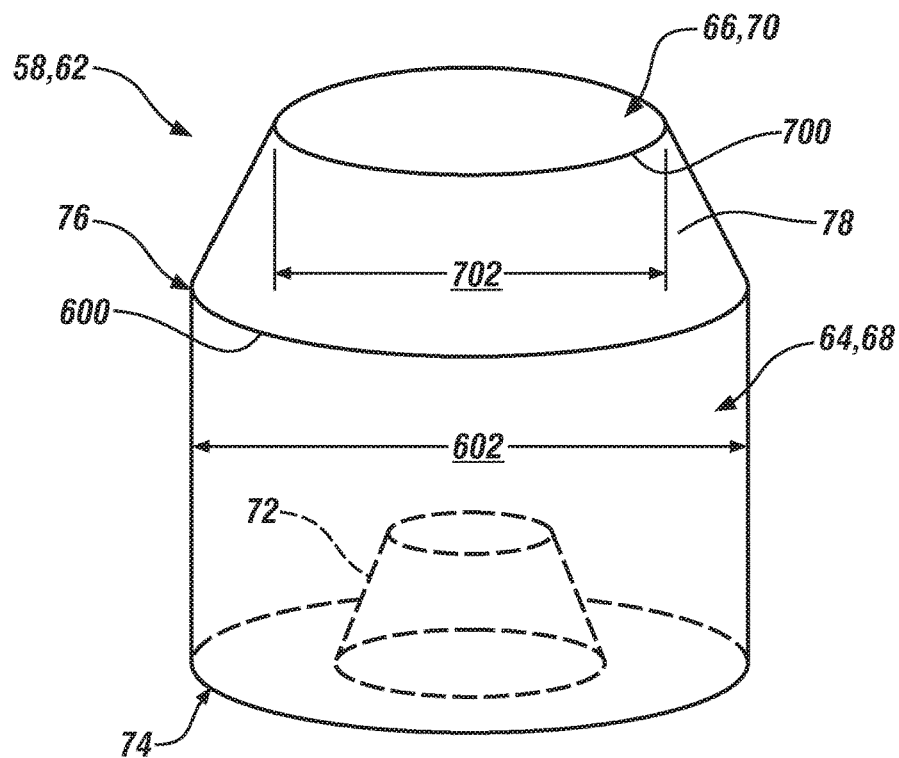
FIG. 5 generally illustrates a welding electrode that may be pressed against either or both of the opposite sides of a workpiece stack-up to facilitate spot welding of the adjacent steel and aluminum workpieces within the workpiece stack-up.
Figure 6:
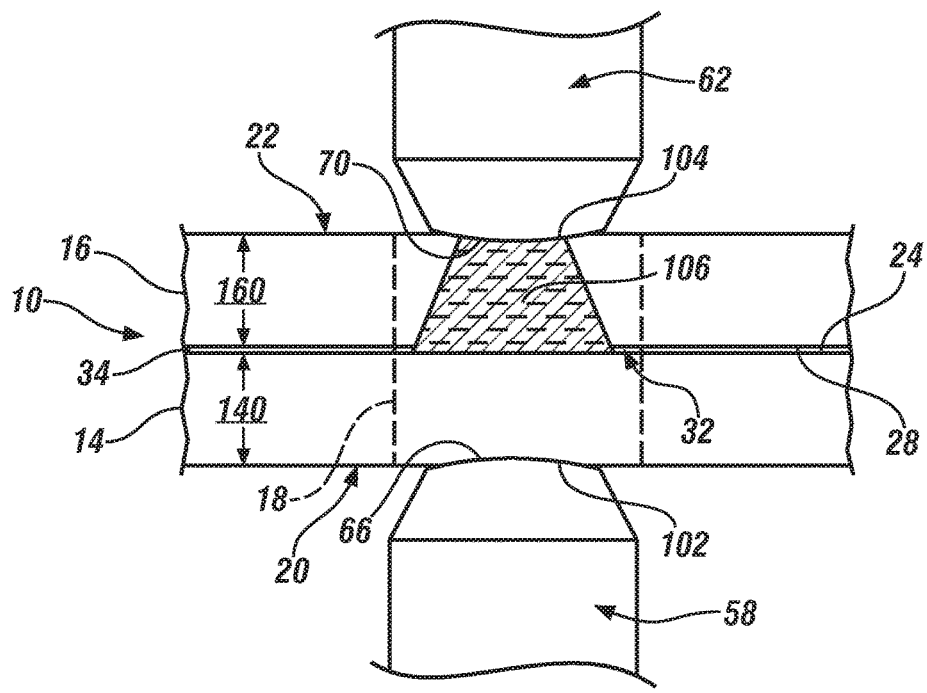
FIG. 6 is a partial cross-sectional view of the workpiece stack-up depicting the creation of a molten aluminum weld pool during the weld joint origination stage of the multi-stage spot welding method according to one embodiment of the disclosure.

The first welding electrode 58 includes a body 64 and a first weld face 66 and, similarly, the second welding electrode 62 includes a body 68 and a second weld face 70. In general, as depicted in FIG. 5, the electrode body 64, 68 of each welding electrode 58, 62 is cylindrical in shape and defines an accessible hollow recess 72 at a back end 74 for insertion of, and attachment with, an electrode shank (e.g., shank 56, 60). The other end of the electrode body 64, 68, or front end 76, has a circumference 600 with a diameter 602. The weld face 66, 70 is disposed on the front end 76 of the electrode body 64, 68 and has a circumference 700, with a diameter 702, that is coincident with the circumference 600 of the body 64, 68 (termed a "full face electrode") or is upwardly displaced from the circumference 600 of the body 64, 68 by a transition nose 78 preferably of frusto-conical or truncated spherical shape. If a transition nose 78 is present, the two circumferences 600, 700 may be parallel as shown here in FIG. 5 or they may be angled such that the circumference 700 of the weld face 66, 70 is tilted relative to the circumference 600 of the front end 76 of the electrode body 64, 68.

The weld faces 66, 70 are the portions of the first and second welding electrodes 58, 62 that make contact with, and are impressed either partially of fully into, the first and second sides 20, 22 of workpiece stack-up 10 during spot welding, respectively. That is, in practice, the weld faces 66, 70 of the first and second welding electrodes 58, 62 are pressed against and into the opposed first and second sides 20, 22 of the workpiece stack-up 10, which, here in FIG. 2, are the exterior outer surfaces 26, 30 of the adjacent steel and aluminum workpieces 14, 16. A broad range of electrode weld face designs may be implemented for each spot welding electrode 58, 62. For example, the weld face 66, 70 of each spot welding electrode 58, 62 may be flat or have a spherical dome shape with a radius of curvature. Additionally, if they are spherically-domed, the weld faces 66, 70 may be smooth, may be roughened, may have a central projection such as a raised plateau or spherical ball-nose projection, or may have concentric rings of ridges that project outwardly from a base or nominal surface of the weld face 66, 70 as disclosed in U.S. Pat. Nos. 8,222,560; 8,436,269; 8,927,894; or in U.S. Pat. Pub. 2013/0200048.

Employing outwardly-projecting ringed ridges on the weld face 70 of the second welding electrode 62 is particularly useful since those surface features help establish good mechanical and electrical contact with an aluminum workpiece (either at the exterior outer surface 30 of the aluminum workpiece 16 that lies adjacent to the steel workpiece 14 or at the exterior outer surface 50 of the additional aluminum workpiece 44 if that workpiece 44 is present) engaged by that electrode 62, especially when the aluminum workpiece includes its natural refractory surface oxide layer(s). The same electrode weld face design is also able to function effectively when pressed into contact against a steel workpiece (either at the exterior outer surface 26 of the steel workpiece 14 that lies adjacent to the aluminum workpiece 16 or at the exterior outer surface 42 of the additional steel workpiece 36 if that workpiece 36 is present) primarily due to the radius of curvature. The ringed ridges have very little effect on the commutation of current through a steel workpiece 14, 36 and, in fact, are quickly deformed by the stresses and elevated temperatures associated with being pressed against steel during spot welding.

The size and composition of the first and second welding electrodes 58, 62 are subject to a fair amount of variability. In many instances, for example, the diameter 602 of the bodies 64, 68 of the two electrodes 58, 62 range from 10 mm to 22 mm, and the diameter 702 of the weld faces 66, 70 of the two electrodes 58, 62 range from 8 mm to 15 mm. And, if the weld face 66, 70 of either or both welding electrodes 58, 62 is spherically domed, the weld face 66, 70 may have a radius of curvature ranging from 5 mm to flat mm, or more narrowly from 20 mm to 50 mm. In terms of their composition, one or both of the first and second welding electrodes 58, 62 may be composed of a copper alloy such as, for example, a zirconium copper alloy (ZrCu) that contains 0.10 wt % to 0.20 wt % zirconium and the balance copper. In other embodiments, one or both of the first and second welding electrodes 58, 62 may be composed of a refractory-based material such as molybdenum, tungsten, or a tungsten-copper alloy that contains between 50 wt % and 90 wt % tungsten and between 50 wt % and 10 wt % copper. A refractory-based material may be particularly useful for the second welding electrode 62 because of the ability of the material to generate and retain heat next to the aluminum workpiece 16 (or the additional aluminum workpiece 44). Other compositions may of course be employed for the welding electrodes 58, 62 besides the specific materials just mentioned.

Referring now specifically to FIGS. 1-2, the first and second gun arms 52, 54 of the weld gun 12 are operable during spot welding to converge and press the weld faces 66, 70 of the first and second welding electrodes 58, 62 against the opposite first and second sides 20, 22 of the workpiece stack-up 10, respectively, which are provided by the oppositely-facing exterior outer surfaces 26, 30 of the adjacent and overlapping steel and aluminum workpieces 14, 16 in FIG. 2. In this illustrated embodiment, for example, the first and second gun arms 52, 54 have approximately orthogonal longitudinal axes, and the first gun arm 52 is moveable along its longitudinal axis towards the stationary second gun arm 54 by an actuator 80 such as a servo motor. An actuator or gun control 82 causes current/voltage to be delivered to the actuator 80, if the actuator 80 is a servo motor, to move the first gun arm 52 so as to engage and press the weld faces 66, 70 of the welding electrodes 58, 62 against the opposite sides 20, 22 of the workpiece stack-up 10 and to apply the desired clamping force. The weld faces 66, 70 are pressed against their respective sides 20, 22 of the workpiece stack-up 10 in facial alignment with one another at the weld site 18.

The weld gun 12 is also configured to pass electrical current between the first and second welding electrodes 58, 62—and through the workpiece stack-up 10 at the weld site 18—when the weld faces 66, 70 of the two electrodes 58, 62 are pressed against the opposite first and second sides 20, 22 of the stack-up 10. Electrical current is delivered, preferably as a direct current (DC), to the weld gun 12 from a controllable power supply 84. The power supply 84 is preferably a medium-frequency direct current (MFDC) inverter power supply that electrically communicates with the first and second welding electrodes 58, 62. A MFDC inverter power supply includes an inverter 86 and a MFDC transformer 88. The inverter 86 receives a three phase mains AC current (480V, 60 Hz in the U.S.). The mains AC current is first rectified and then inverted to produce a single phase input AC current, usually a square wave AC current, of higher voltage that is fed to the transformer 88, typically at 1000 Hz. The transformer 88 then "steps down" the input AC voltage to generate a lower-voltage, higher-amperage AC current which is then fed to the rectifier where a collection of semiconductor diodes converts the supplied AC current into a low-ripple DC current suitable for the present spot welding method. A MFDC inverter power supply 84 can be obtained commercially from a number of suppliers including Roman Manufacturing (Grand Rapids, Mich.), ARO Welding Technologies (Chesterfield Township, Mich.), and Bosch Rexroth (Charlotte, N.C.).

A weld controller 90 controls the power supply 84 including the manner in which the electrical current is delivered to the first and second welding electrodes 58, 62. Specifically, the weld controller 90 interfaces with the power supply 84 and allows a user to program a weld schedule that sets and dynamics of the electrical current being delivered to the welding electrodes 58, 62 over the course of a spot welding event. The weld schedule allows for customized control of the current level at any given time and the duration of current flow at any given current level, among others, and further allows for such attributes of the electrical current to be responsive to changes in very small time increments down to fractions of a millisecond. In this way, the weld controller 90 instructs the power supply 84 to deliver electrical current to and between the first and second welding electrodes 58, 62 and through the workpiece stack-up 10 and across the faying interface 32 at the weld site 18.

Turning now to FIGS. 6-12, preferred and exemplary embodiments of the multi-stage spot welding method are shown with reference to idealized illustrations of the various stages of the method (FIGS. 6-11) as well as to a weld schedule (FIG. 12) adapted to carry out the method. It should be noted that only the adjacent steel and aluminum workpieces 14, 16 are depicted in FIGS. 6-11. The presence of the additional steel or aluminum workpiece 36, 44 in the workpiece stack-up 10 does not affect how the multi-stage spot welding method is carried out or have any substantial effect on the joining mechanism that takes place at the faying interface 32 of the adjacent steel and aluminum workpieces 14, 16. For that reason, when the multi-stage spot welding method is described in further detail below, only the adjacent steel and aluminum workpieces 14, 16 are shown for the sake of simplicity. The more-detailed discussion provided below applies equally to instances in which the workpiece stack-up 10 includes the additional steel or an additional aluminum workpiece 36, 44 (FIGS. 3 and 4) despite the fact that any such additional workpiece 36, 44 has been omitted from the Figures.

The multi-stage spot welding method includes a weld joint origination stage 92 and one or more weld joint refining stages 94 that follow the weld joint origination stage 92. These stages 92, 94 are identified in the representative weld schedule depicted in FIG. 12. In the weld joint origination stage 92, a weld joint 96 (FIGS. 7-8) that joins the adjacent steel and aluminum workpieces 14, 16 together at their faying interface 32 is initially formed. Afterwards, in a first execution of the one or more weld joint refining stages 94, the weld joint 96 is remelted and resolidified at least partially at the faying interface 32 while preferably not forcing interfacial expulsion. The weld joint refining stage 94 may be repeated as many times as desired to reduce the prevalence of weld defects—in particular those caused by surface oxide remnants—at the faying interface 32 in order to enhance at least the peel strength of the final refined weld joint ultimately produced by the multi-stage spot welding method. The exact number of weld joint refining stages 94 practiced depends on a balance of several factors including incremental gains in joint strength per refining stage 94, the promotion of other failure modes such as the growth of intermetallic compounds at the faying interface 32, and the time needed to practice the refining stages 94. In general, it is sufficient to practice in succession between one and fifteen, or more narrowly between one and eight, weld joint refining states 94 after the weld joint origination stage 92.

Figure 12:
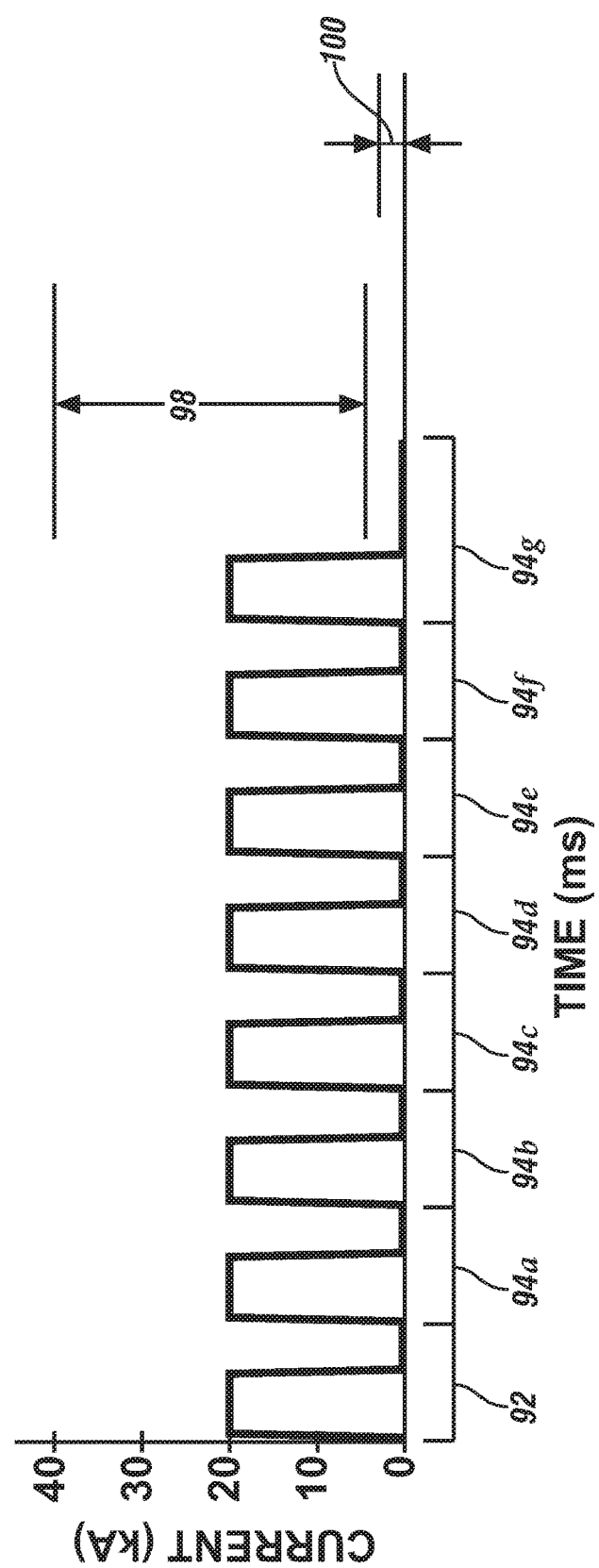
FIG. 12 is a general graphical depiction of the multi-stage spot welding method as represented by a weld schedule that shows how electrical current is passed between the welding electrodes in order to conduct resistance spot welding of the steel and aluminum workpieces as depicted in FIGS. 6-11. Plotted in the graph of FIG. 12 are the current levels and durations of multiple stages of electrical current flow that are passed between the welding electrodes while the electrodes are pressed against their respective sides of the workpiece stack-up.

Each of the weld joint origination stage 92 and the one or more succeeding weld joint refining stages 94 includes passing electrical current between the first and second welding electrodes 58, 62 to generate heat within the weld site 18 followed by reducing current flow between the welding electrodes 58, 62 to allow the weld site 18 to cool. Indeed, in each stage 92, 94, as shown in FIG. 12, a direct electrical current (DC current) is passed at a current level that lies within a working current level range 98, and is then dropped to a current level that lies within a reduced current level range 100, preferably all the way to 0 kA, in order to achieve the desired melting and freezing action, respectively, of each stage 92, 94. The working current level range 98 preferably spans between 10 kA and 40 kA, or more narrowly between 12 kA and 30 kA, and the reduced current level range preferably ranges from 0 kA to 5 kA, or more narrowly from 0 kA to 2 kA. The current level of the direct electrical current may be maintained within the working current level range 98 for a duration of 10 ms to 1000 ms, or more narrowly from 20 ms to 500 ms, and may subsequently be maintained within the reduced current level range 100 for a duration of 10 ms to 1000 ms, or more narrowly from 20 ms to 500 ms.

The exact current levels and durations of the direct electrical current employed within the working current level range 98 and the reduced current level range 100 for each stage 92, 94 of the multi-stage spot welding method may vary depending on several factors. For instance, a primary factor that affects the current levels, heating times, and cooling times of each stage 92, 94 is the total thickness of the workpiece stack-up 10, primarily the thickness 140 of the steel workpiece 14. As such, the maximum current level attained in each stage 92, 94 may be coordinated with the duration of current flow (heating time) to achieve the desired heating and melting without generating so much heat in the steel workpiece 14 that interfacial surface expulsion occurs between the workpieces 14, 16 at the faying interface 32.

The reduced current level employed in each stage 92, 94 and the duration of reduced current flow (cooling time) may also be tied to the thickness 140 of the steel workpiece 14 as heavier gauge steel workpieces require more time to cool. In fact, regarding cooling times, there is considered to be a linear relationship between cooling times and the thickness 140 of the steel workpiece 14. If, for example, a 2.0-mm thick steel workpiece requires a minimum of 100 ms of cool time, then the same steel workpiece at 0.9-mm thick would require a minimum of 45 ms of cool time and at 0.6-mm would require a minimum of 30 ms of cool time.

The electrical current passed between the first and second welding electrodes 58, 62 may be maintained within the working current level range 98 in a variety of ways to dictate current flow and provide the needed heating effect. For example, the electrical current may be set and maintained at a constant current level, as shown in FIG. 12. Of course, the same activity at each stage 92, 94 can also be realized with different electrical current profiles in lieu of exchanging current at a constant current level. The electrical current may, as an alternative, have a current level that increases (positive slope) or decreases (negative slope) with time within the working current level range 98. As another alternative, the electrical current may be pulsed to peak current levels contained within the working current level range 98 with current level reductions of small durations separating each current pulse. Still further, the electrical current may be programmed to experience some combination of constant current levels, increasing/decreasing current levels, and/or current pulsing, if desired.

The metallurgical developments that transpire within the workpiece stack-up 10 during each of the weld joint origination stage 92 and the weld joint refining stage(s) 94 will now be described with reference to FIGS. 6-11. To begin, the workpiece stack-up 10 is located between the first and second welding electrodes 58, 62 so that the weld site 18 is between the axially-facially-aligned weld faces 66, 70 of the two electrodes 58, 62, as shown in FIGS. 2 (two workpiece stack-up), 3-4 (three workpiece stack-up), and FIGS. 6-7, 9, and 11. The workpiece stack-up 10 may be brought to such a location, as is often the case when the gun arms 52, 54 are part of a stationary pedestal welder, or the gun arms 52, 54 may be robotically moved to locate the electrodes 58, 62 relative to the weld site 18. Once the workpiece stack-up 10 is properly located, the weld gun 12 is operated to converge the first and second welding electrodes 58, 62 relative to one another so that their respective weld faces 66, 70 make contact with, and press against, the opposite first and second sides 20, 22 of the stack-up 10 at the weld site 18, which, here in this embodiment, are the oppositely-facing exterior outer surfaces 26, 30 of the steel and aluminum alloy workpieces 14, 16. The convergence of the first and second welding electrodes 58, 62 is achieved in this particular embodiment by causing the actuator 80 (via the actuator or gun control 82) to move the first gun arm 52 forward along its longitudinal axis towards the stationary second gun arm 54.

The weld faces 66, 70 of the first and second welding electrodes 58, 62 are pressed against their respective sides 20, 22 of the workpiece stack-up 10 in facing alignment with one another at the weld site 18 under a clamping force that ranges, for example, between 400 lb and 2000 lb or more narrowly between 600 lb and 1300 lb. This clamping force establishes good mechanical and electrical contact between the weld faces 66, 70 of the welding electrodes 58, 62 and the sides 20, 22 of the workpiece stack-up 10 they engage. Upon making contact with the workpiece stack-up 10 under pressure, the first and second weld faces 42, 44 impress into their respective opposite side surfaces of the stack-up 10. The resultant indentations originated by the opposed weld faces 66, 70 are referred to here as a first contact patch 102 and a second contact patch 104. The clamping force assessed by the gun arms 52, 54 is maintained throughout the multi-stage spot welding method until after the one or more weld joint refining stages 94 are completed.

The weld joint origination stage 92 is commenced once the first and second welding electrodes 58, 62 are pressed against their respective sides 20, 22 of the workpiece stack-up 10 at the weld site 18. During this stage, which is shown schematically in FIG. 6, a molten aluminum weld pool 106 is initially created within the aluminum workpiece 16 by passing electrical current between the welding electrodes 58, 62 and through the workpiece stack-up 10 at a current level within the working current level range 98 for a first period of time. The exact current level profile of the applied electrical current and the duration of the first period of time depend on several factors. The main factors that influence the current level and duration of the applied electrical current are the thicknesses 140, 160 of the steel and aluminum workpieces 14, 16 at the weld site 18, the presence of any additional workpiece 36, 44 in the stack-up 10, and the form and composition of the workpieces 14, 16 (and possibly 36 or 44) that are present. In many instances, though, the electrical current exchanged between the first and second welding electrodes 58, 62 is a direct current having a constant (slope=0) or increasing (slope >0) current level that lies between 12 kA and 30 kA for a duration of between 50 ms and 500 ms.

The molten aluminum weld pool 106 is created by resistance to the flow of the electrical current exchanged between the first and second welding electrodes 58, 62. In particular, resistance to the flow of the electrical current through the adjacent steel and aluminum workpieces 14, 16 and across their faying interface 32 generates heat and initially heats up the steel workpiece 14 more quickly than the aluminum workpiece 16. The generated heat eventually initiates the molten aluminum weld pool 106 and then continues to grow the weld pool 106 to its desired size. Indeed, at the beginning of electrical current flow when the second contact patch 104 is relatively small in area and current density is relatively high, the molten aluminum weld pool 106 initiates quickly and rapidly grows and penetrates into the aluminum workpiece 16. As the second contact patch 104 increases in area over the course of electrical current flow due to the continued indentation of the weld face 70 of the second spot welding electrode 62 into the second side 22 of the workpiece stack-up 10, the electrical current density decreases and the molten aluminum weld pool 106 grows more laterally in the vicinity of the faying interface 32.

The molten aluminum weld pool 106 created during the weld joint origination stage 92 extends into the aluminum workpiece 16 from the faying interface 32 of the two adjacent workpieces 14, 16. The portion of the molten aluminum weld pool 106 adjacent to the faying interface 32, consequently, wets the faying surface 24 of the steel workpiece 14. The molten aluminum weld pool 106 may penetrate a distance into the aluminum workpiece 16 that ranges from 20% to 100% of the thickness 160 of the aluminum workpiece 16 at the weld site 18. And, in terms of its composition, the molten aluminum weld pool 106 is composed predominantly of molten aluminum material derived from the aluminum workpiece 16. The steel workpiece 14 does not typically melt during current flow because of its relatively high melting point compared to aluminum. As such, molten steel material is generally not available to coalesce with the molten aluminum weld pool 106, although it may be possible for certain elements and/or compounds to dissolve from the steel workpiece 14 into the molten aluminum weld pool 106 and vice versa.

Figure 7:
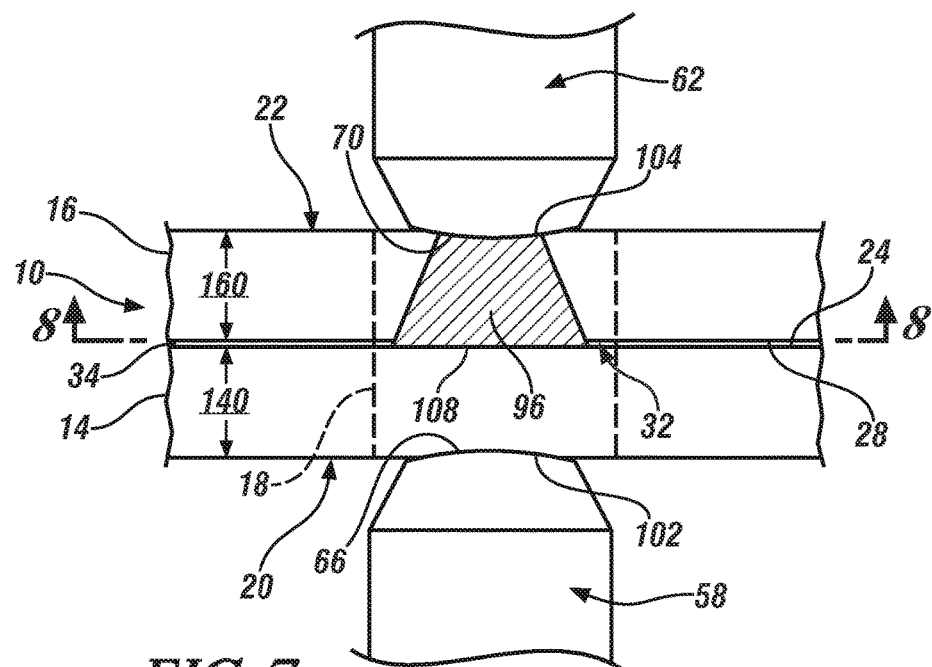
FIG. 7 is a partial cross-sectional view of the workpiece stack-up depicting the solidification of the molten aluminum weld pool into a weld joint during the weld joint origination stage of the multi-stage spot welding method according to one embodiment of the disclosure.

After being created, the molten aluminum weld pool 106 is allowed to cool and solidify into the weld joint 96 to conclude the weld joint origination stage 92, as illustrated in FIG. 7. Cooling and solidification of the molten aluminum weld pool 106 can be realized over a second period of time, which follows the first period of time, by dropping the current level of the electrical current to within the reduced current level range 100 in one of two ways. First, passage of electrical current between the first and second spot welding electrodes 58, 62 can be ceased by programming the weld controller 90 to reduce electrical current flow to 0 kA. And second, if ceasing electrical current flow altogether is not desired, electrical current can be passed between the first and second spot welding electrodes 58, 62 at a current level within the reduced current level range 100, yet above 0 kA, that consequently is unable to maintain the molten state of the weld pool 106. The exact current level profile of the applied electrical current and the duration of the second period of time may vary based on a variety of factors including the thicknesses 140, 160 of the workpieces 14, 16 at the weld site 18, the presence of any additional workpiece 36, 44 in the stack-up 10, and the form and composition of the workpieces 14, 16 (and possibly 36 or 44) that are present. Passing an electrical current at a current level below 2 kA, and preferably ceasing current altogether (i.e, 0 kA), for between 20 ms and 500 ms is usually sufficient to solidify the molten aluminum weld pool 106 into the weld joint 96.

Figure 8:
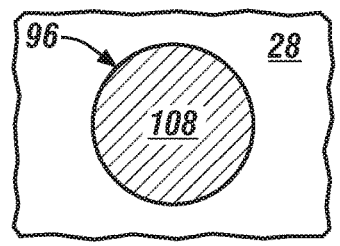
FIG. 8 is a plan view, taken along lines 8-8, of the interfacial weld bond area of the weld joint according to one embodiment of the disclosure.

The weld joint 96 produced in the weld joint origination stage 92 extends a distance from the faying interface 32 into the aluminum workpiece 16 to a penetration depth. The penetration depth of the weld joint 96 may range from 20% to 100% (100% being all the way through the aluminum workpiece 16) of the thickness 160 of the aluminum workpiece 16 at the weld site 18. At this point, the thickness 160 of the aluminum workpiece 16 at the weld site 18 is typically less than the thickness outside of the weld site 18 due to the continued indentation of the second welding electrode 62 during current flow and the resultant growth of the second contact patch 104 on the second side 22 of the workpiece stack-up 10. Additionally, the weld joint 96 includes an interfacial weld bond area 108, as shown in FIGS. 7 and 8, which is the surface area of the weld joint 96 adjacent to and joined with the faying surface 24 of the steel workpiece 14 including any intermetallic Fe—Al reaction layers that may have grown next to the faying surface 24 of the steel workpiece 14 at the faying interface 32.

The interfacial weld bond area 108 of the weld joint 96, as reported in mm$^2$, is preferably at least $4(\pi)(t)$ in which "t" is the thickness 160 of the aluminum workpiece 16 in millimeters at the weld site 18 prior to initiation of the second contact patch 104. In other words, when calculating the preferred $4(\pi)(t)$ weld bond area size, the thickness "t" of the aluminum workpiece 16 is the original thickness of the workpiece 16 as measured prior to indentation of the weld face 70 of the second welding electrode 62. The interfacial weld bond area 108 can be varied as desired by managing the size of the molten aluminum weld pool 106 grown in the weld joint origination stage 92. And, as will be further explained below, the interfacial weld bond area 108 of the weld joint 96 is refined in the one or more weld joint refining stages 94 to ultimately arrive at a final refined weld joint. The final refined weld joint possesses good strength, which is consistently attainable, as the one or more weld joint refining stages 94 promote cleaner and more stable bonding contact between an interfacial weld bond area of the final refined weld joint and the faying surface 24 of the steel workpiece 14.

To be sure, the weld joint 96 may include weld defects dispersed at and along the faying interface 32 within the interfacial weld bond area 108 following conclusion of the weld joint origination stage 92. These defects—which can include gas porosity, shrinkage voids, micro-cracking, and surface oxide remnants—may be swept towards the faying interface 32 during solidification of the molten aluminum weld pool 106. Moreover, surface oxide remnants and their accompanying weld defects may be rendered more prevalent and tenacious within the weld joint 96 and along the faying interface 32 whenever an intermediate organic material layer 34 is disposed between the faying surfaces 24, 28 of the steel and aluminum workpieces 14, 16, as previously discussed. The weld joint 96 may also include one or more thin reaction layers of Fe—Al intermetallic compounds (not shown) adjacent to the faying interface 24 of the steel workpiece 14. These layers are hard and brittle, and are produced mainly as a result of reaction between the molten aluminum weld pool 106 and the steel workpiece 14 at spot welding temperatures. The one or more reaction layers of Fe—Al intermetallic compounds may include intermetallics such as $FeAl_3$, $Fe_2Al_5$, as well others, and their combined thickness typically ranges from 1 μm to 10 μm.

Figure 9:
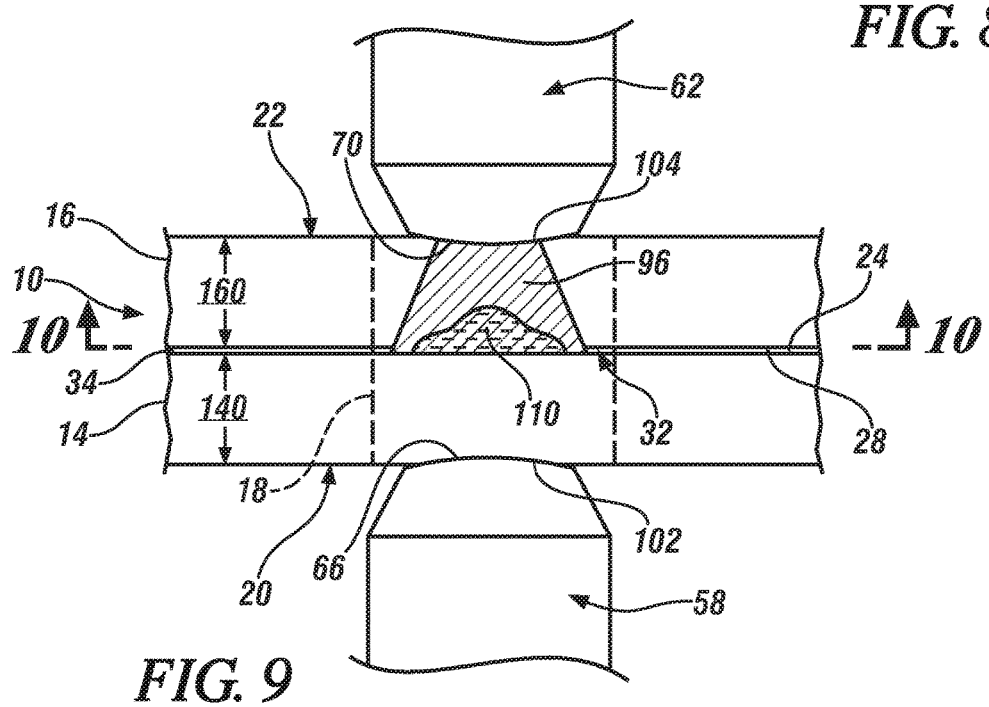
FIG. 9 is a partial cross-sectional view of the workpiece stack-up depicting remelting of at least part of the weld joint during a weld joint refining stage of the multi-stage spot welding method according to one embodiment of the disclosure.
Figure 10:
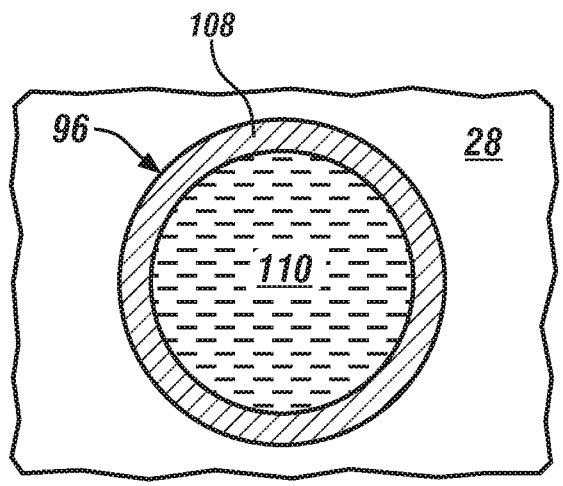
FIG. 10 is a plan view, taken along lines 10-10, of the weld joint being remelted (FIG. 9) during a weld joint refining stage of the multi-stage spot welding method according to one embodiment of the disclosure.
Figure 11:
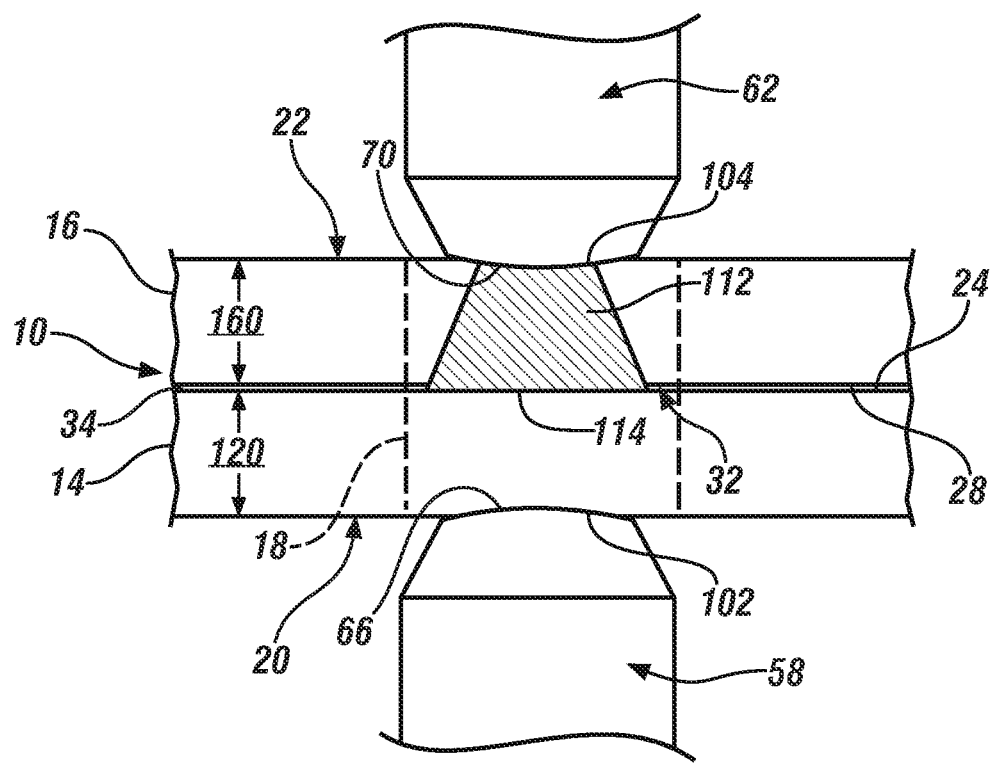
FIG. 11 is a partial cross-sectional view of the workpiece stack-up depicting resolidification of the remelted portion of the weld joint during a weld joint refining stage of the multi-stage spot welding method according to one embodiment of the disclosure.

After the weld joint 96 has been initially formed, the one or more weld joint refining stages 94 are carried out. During the first weld joint refining stage 94a, at least a portion 110 of the weld joint 96 is remelted at the interfacial weld bond area 108, as depicted in FIGS. 9-10, and then resolidified to form a first refined weld joint 112 as depicted in FIG. 11. The weld joint 96 is remelted by passing electrical current between the welding electrodes 58, 62 and through the workpiece stack-up 10 and the weld joint 96 at a current level within the working current level range 98 for a third period of time. The exact current level profile of the applied electrical current and the duration of the third period of time depend mainly on the same factors mentioned before. Additionally, the electrical current may be passed at a higher current level in this stage 94a than in the weld joint origination stage 92 since the weld face 70 of the second spot welding electrode 62 is further impressed into the workpiece stack-up 10 and the faying interface 32 is less liable to generate heat within the weld site 18 since the weld joint 96 is more electrically conductive than the previously distinct and unjoined faying surfaces 24, 28 of the workpieces 14, 16. In many instances, though, the electrical current exchanged between the first and second welding electrodes 58, 62 is a direct current having a constant (slope=0) or increasing (slope >0) current level that lies between 15 kA and 30 kA for a duration of between 30 ms and 300 ms.

The remelted portion 110 of the weld joint 96 encompasses at least part of, and preferably all of, the interfacial weld bond area 108. For example, at least 50%, and preferably at least 80%, of the interfacial weld bond area 108 is remelted and consumed by the remelted portion 110. Furthermore, the remelted portion 110 may extend into the weld joint 96 at least part of the way to the penetration depth of the weld joint 96. In fact, during the first weld joint refining stage 94a, the entire weld joint 96 up to its penetration depth and including all (i.e., 100%) of the interfacial weld bond area 108 may be remelted during passage of the electrical current. This is possible because the second contact patch 104 created by the indention of the second spot welding electrode 62 into the second side 22 of the workpiece stack-up 10 has likely not yet grown to the point where the corresponding reduction in current density makes full remelting of the weld joint 96 difficult. What is more, depending on the current level and duration of the electrical current, the remelted portion 110 of the weld joint 96 may consume the entire interfacial weld bond area 108 and combine with freshly melted aluminum material from the aluminum workpiece 16 outside of, and adjacent to, the interfacial weld bond area 108. In this scenario, the first refined weld joint 112 has an interfacial weld bond area 114 (FIG. 11) that is greater in area—preferably up to 50% greater in area—than the interfacial weld bond area 108 of the weld joint 96 initially formed during the weld joint origination stage 92.

After remelting some or all of the weld joint 96, and with the first and second welding electrodes 58, 62 still pressed against their respective sides 20, 22 of the workpiece stack-up 10, the remelted portion 110 (as well as any newly melted material of the aluminum workpiece 16 outside of the previously formed weld joint 96) is allowed to cool and resolidify to form the first refined weld joint 112 to conclude the first weld joint refining stage 94a, as illustrated in FIG. 11. Cooling and solidification of the remelted portion 110 can be realized over a fourth period of time, which follows the third period of time, by dropping the current level of the electrical current to within the reduced current level range 100 in one of the same two ways as previously described (i.e., ceasing current flow or reducing current flow to low current level). The exact current level profile of the applied electrical current and the duration of the fourth period of time depend mainly on the same factors mentioned before. Passing an electrical current at a current level below 2 kA, and preferably ceasing current altogether (i.e, 0 kA), for between 20 ms and 500 ms is usually sufficient to solidify the remelted portion 110 to form the first refined weld joint 112.

The first refined weld joint 112 is comprised of the resolidified weld joint material derived from the remelted portion 110 as well as any portions of the previously formed weld joint 96, if any, that did not undergo remelting in the weld joint refining stage 94. The portion of the refined weld joint 112 derived from the remelted portion 110 and the portions of the previously formed weld joint 96, if any, that did undergo remelting may or may not be distinguishable in terms of composition. Rather, the first weld joint refining stage 94a is performed with the goal of reducing the proliferation and/or dissemination of weld defects within the first refined weld joint 112 at the faying interface 32 compared to the weld joint 96 initially formed in the weld joint origination stage 92. Such refining is believed to result in cleaner bonding contact between the interfacial weld bond area 114 of the first refined weld joint 112 and the faying surface 24 of the steel workpiece 16, compared to the initially formed weld joint 96, which, in turn, has a positive contribution on the strength of the first refined weld joint 112 formed between the steel and aluminum workpieces 14, 16.

The weld joint refining stage 94 may be repeated to remelt and resolidify at least a portion of the first refined weld joint 112 at the interfacial weld bond area 114 to attain further refinement of the weld defects in that area. Each additional weld joint refining stage 94 is carried out in the same manner as just described. In particular, electrical current may be passed between the welding electrodes 58, 62 and through the workpiece stack-up 10 at a current level within the working current level range 98, followed by dropping the current level of the electrical current to within the reduced current level range 100, in order to remelt and resolidify at least a portion of the first refined weld joint 112 to form a second refined weld joint. While the second refined weld joint is not separately and expressly illustrated in the drawings, it should be appreciated that the schematic portrayals included in FIGS. 6-11 apply equally to the development and formation of the second refined weld joint (from the previously formed first refined weld joint 112) as well as any additional refined weld joints formed during additional succeeding weld joint refining stages 94.

As before with the first weld joint refining stage 94a, the remelted portion of the first refined weld joint 112 encompasses at least part of the interfacial weld bond area 114. For example, at least 50%, and preferably at least 80%, of the interfacial weld bond area 114 is remelted and consumed by the remelted portion obtained during the second weld joint refining stage 94b. Moreover, during the second weld joint refining stage 94b, the entire first refined weld joint 112 up to its penetration depth and including all (i.e., 100%) of the interfacial weld bond area 114 may be remelted during passage of the electrical current. The remelted portion of the first refined weld joint 112 may even consume the entire interfacial weld bond area 114 and combine with freshly melted aluminum material from the aluminum workpiece 16 outside of, and adjacent to, the interfacial weld bond area 114, like before in the earlier weld joint refining stage 94a, such that an interfacial weld bond area of the second refined weld joint is greater in area—preferably up to 50% greater in area—than the interfacial weld bond area 114 of the first refined weld joint 112.

The second refined weld joint is comprised of the resolidifed weld joint material derived from the remelted portion of the first refined weld joint 112 as well as any portions of the first refined weld joint 112, if any, that did not undergo remelting and resolidification. After the second refined weld joint has been attained, additional weld joint refining stages 94 may be executed including a third weld joint refining stage 94c to attain a third refined weld joint, a fourth weld joint refining stage 94d to attain a fourth refined weld joint, a fifth weld joint refining stage 94e to attain a fifth refined weld joint, and so on to whatever extent desired, in the same manner set forth above with regards to the first two weld joint refining stages 94a, 94b. Typically, anywhere from one to fifteen, or more narrowly from one to eight, weld joint refining stages 94 may be practiced in succession following the weld joint origination stage 92. After all of the weld joint refining stages 94 are performed, a final refined weld joint is produced. The final refined weld joint produced by the multi-stage spot welding method preferably has an interfacial bond area of at least $9(\pi)(t)$ in which "t" is the thickness 160 of the aluminum workpiece 16 in millimeters at the weld site 18 prior to initiation of the second contact patch 104.

While the one or more weld joint refining stages 94 are all practiced in the same general way, it may be more challenging to remelt the entirety of the previously formed refined weld joint up to its penetration depth as the number of weld joint refining stage 94 increases. The shallower penetration of the remelted portion occurs because the weld face 70 of the second welding electrode 62 continues to indent further into the second side 22 of the workpiece stack-up 10, and the second contact patch 104 correspondingly increases in size, with each weld joint refining stage 94 that is performed. This means that electrical current is passed between the welding electrodes 58, 62 over a broader area, which has the effect of promoting remelting closer to the faying interface 32 with less penetration into the refined weld joint compared to earlier weld joint refining stages 94. The fact that the entirety of the previously formed refined weld joint may not be remelted up to its penetration depth in the latter weld joint refining stages 94 is not cause for concern. As long as at least a portion of the interfacial weld bond area of the refined weld joint is remelted—that portion preferably being at least 50% and more preferably at least 80% of the interfacial weld bond area—the refining benefits that contribute to improved joint strength can be achieved.

The one or more weld joint refining stages 94 of the multi-stage spot welding method are believed to improve the strength, most notably the peel strength, of the final refined weld joint produced by the method as compared to the initially formed weld joint 96 in several ways. Without being bound by theory, it is believed that remelting the initially formed weld joint 96, especially the interfacial weld bond area 108 at the faying interface 32, consolidates, disperses, and eliminates to some extent the various weld defects that get driven to and along the faying interface 32 during solidification of the molten aluminum weld pool 106, thus improving the ability of the first refined weld joint 112 to bond with the faying surface 24 of the steel workpiece 14. The creation of the remelted portion 110, for example, is thought to consolidate entrained gas porosity near the center of the first refined weld joint 112 while thermal expansion, contraction, and phase changes within the remelted portion 110 during melting and solidification is thought to break up and disperse residual oxides and eliminate micro-cracks that may be present at the interfacial weld bond area 114 or in the vicinity. Such refinement is further magnified by performing multiple weld joint refining stages 94 one after another.

After the weld joint origination stage 92 and the one or more weld joint refining stages 94 are concluded, and the final refined weld joint has been produced, the first and second welding electrodes 58, 62 are retracted from their respective first and second sides 20, 22 of the workpiece stack-up 10. The workpiece stack-up 10 is then moved relative to the weld gun 12 and located between the spot welding electrodes 58, 62 at another weld site 18 where the multi-stage spot welding process is repeated, or the workpiece stack-up 10 is moved away from the weld gun 12 to make way for another workpiece stack-up 10. The above-described multi-stage spot welding method can thus be carried out many times at different weld sites 18 on the same or different workpiece stack-up in a manufacturing setting to successfully, consistently, and reliably form refined weld joints between a steel workpiece and an adjacent aluminum workpiece that conform to minimum strength standards.

EXAMPLES

The following examples demonstrate specific implementations of the multi-stage spot welding method as applied to different workpiece stack-ups having a steel workpiece and an aluminum workpiece that lie adjacent to one another. In each of these examples, a refined weld joint was produced between the steel and aluminum workpieces by the multi-stage spot welding method and then subjected to peel strength testing. Weld joint peel strength is noteworthy property for weld joints. This is especially true for weld joints used in conjunction with a structural adhesive since adhesives generally provide shear strength, but perform poorly in peel. The peel strengths reported here were measured with T-peel samples. The T-peel samples were obtained by first bending coupons (5 in. by 1.5 in.) into an L-shape. The short legs of two L-shape coupons were then mated and a refined weld joint was formed according to the above detailed multi-stage spot welding method between the mating surfaces. The long legs of the resultant T-peel samples were mounted in a tensile machine and the pulled until the weld joint failed. Maximum loading in Newtons (N) is reported as the peel strength. As can be seen, the peel strengths obtained from the multi-stage spot welding method were significantly greater than the peel strength expected (~150 N) from a conventional spot welding method that exchanges current at a constant current level in a single step.

Example 1

Figure 13:
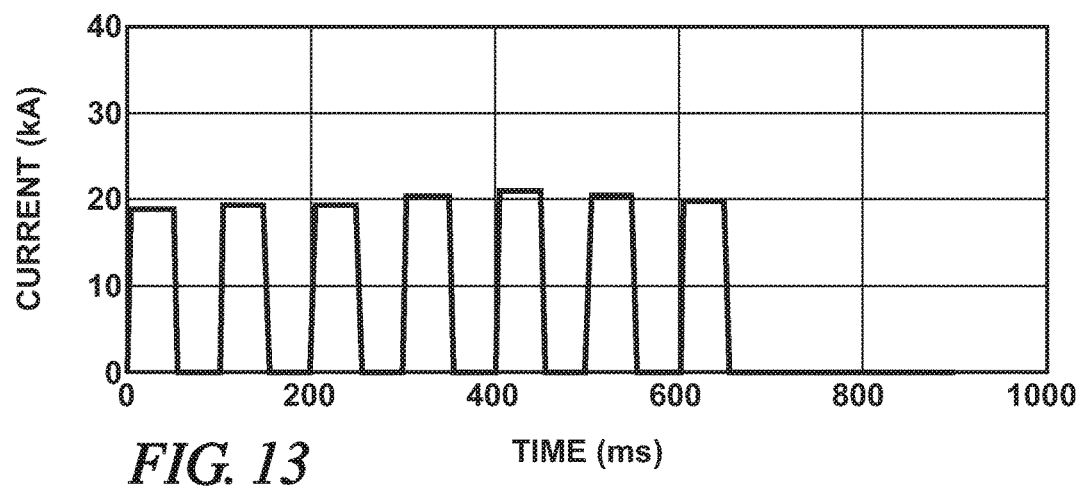
FIG. 13 is a graphical depiction of one particular embodiment of the multi-stage spot welding method as represented by a weld schedule that shows how electrical current is passed between the welding electrodes.

In this example, which corresponds to FIG. 13, a 0.8-mm thick X626-T4 aluminum alloy workpiece was spot welded to a 0.9-mm thick hot-dip galvanized steel workpiece by the multi-stage spot welding method under 800 lb of force applied by the spot welding electrodes until the conclusion of the last weld joint refining stage. Here, in the weld joint origination stage, as shown, electrical current was passed through the workpieces at a constant current level of 19 kA for a first period of 50 ms to create a molten aluminum weld pool within the aluminum workpiece. Passage of electrical current was then ceased for a second period of 50 ms to solidify the molten aluminum weld pool into a weld joint. Next, six weld joint refining stages were executed. For each weld joint refining stage, the current level and magnitude of the electrical current passed between the electrodes to cause remelting, and the extent and duration to which the current level of the electrical current was dropped to allow for resolidification, are set forth below in Table 1. The peel strength of the refined weld joint obtained from the method was measured at 351 N.

TABLE 1

Details of Weld Joint Refining Stages in Example 1

| | Remelting | | Resolidifying | |
|---|---|---|---|---|
| Stage # | Current Level (kA) | Duration (ms) | Current Level (kA) | Duration (ms) |
| 1 | 19.5 | 50 | 0 | 50 |
| 2 | 19.5 | 50 | 0 | 50 |
| 3 | 20.5 | 50 | 0 | 50 |
| 4 | 21 | 50 | 0 | 50 |
| 5 | 20.5 | 50 | 0 | 50 |
| 6 | 20 | 50 | 0 | 250 |

Example 2

Figure 14:
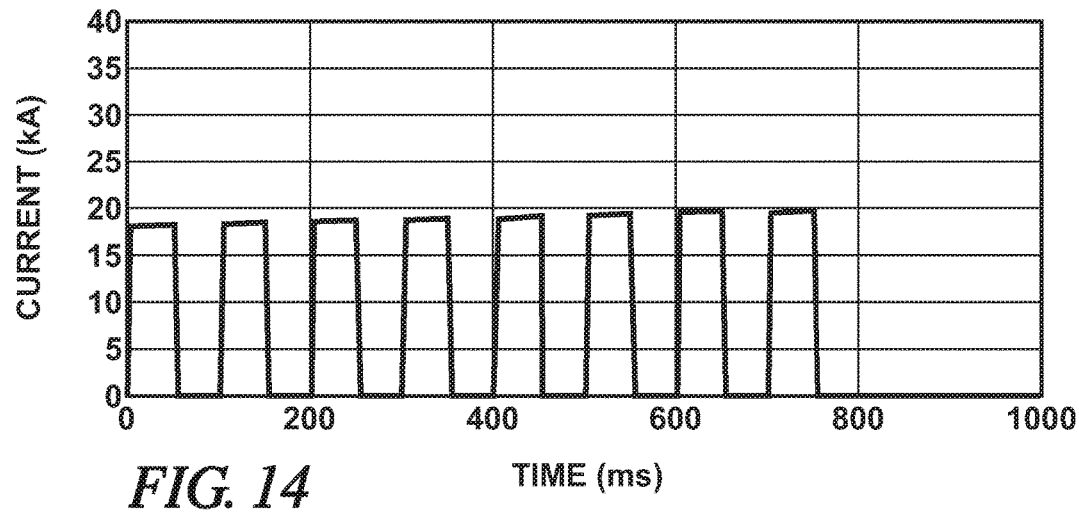
FIG. 14 is a graphical depiction of another particular embodiment of the multi-stage spot welding method as represented by a weld schedule that shows how electrical current is passed between the welding electrodes.

In this example, which corresponds to FIG. 14, a 0.8-mm thick X626-T4 aluminum alloy workpiece was spot welded to a 0.9-mm thick hot-dip galvanized steel workpiece by the multi-stage spot welding method under 800 lb of force applied by the spot welding electrodes until the conclusion of the last weld joint refining stage. Here, in the weld joint origination stage, as shown, electrical current was passed through the workpieces at a current level that increased linearly from 18.02 kA to 18.25 kA over a first period of 50 ms to create a molten aluminum weld pool within the aluminum workpiece. Passage of electrical current was then ceased for a second period of 50 ms to solidify the molten aluminum weld pool into a weld joint. Next, seven weld joint refining stages were executed. For each weld joint refining stage, the current level and magnitude of the electrical current passed between the electrodes to cause remelting, and the extent and duration to which the current level of the electrical current was dropped to allow for resolidification, are set forth below in Table 2. The peel strength of the refined weld joint obtained from the method was measured at 295 N.

TABLE 2

Details of Weld Joint Refining Stages in Example 2

| | Remelting | | Resolidifying | |
|---|---|---|---|---|
| Stage # | Current Level (kA) | Duration (ms) | Current Level (kA) | Duration (ms) |
| 1 | 18.27-18.5 | 50 | 0 | 50 |
| 2 | 18.52-18.75 | 50 | 0 | 50 |
| 3 | 18.77-19 | 50 | 0 | 50 |
| 4 | 19.02-19.25 | 50 | 0 | 50 |
| 5 | 19.27-19.5 | 50 | 0 | 50 |
| 6 | 19.52-19.75 | 50 | 0 | 50 |
| 7 | 19.77-20 | 50 | 0 | 250 |

Example 3

Figure 15:
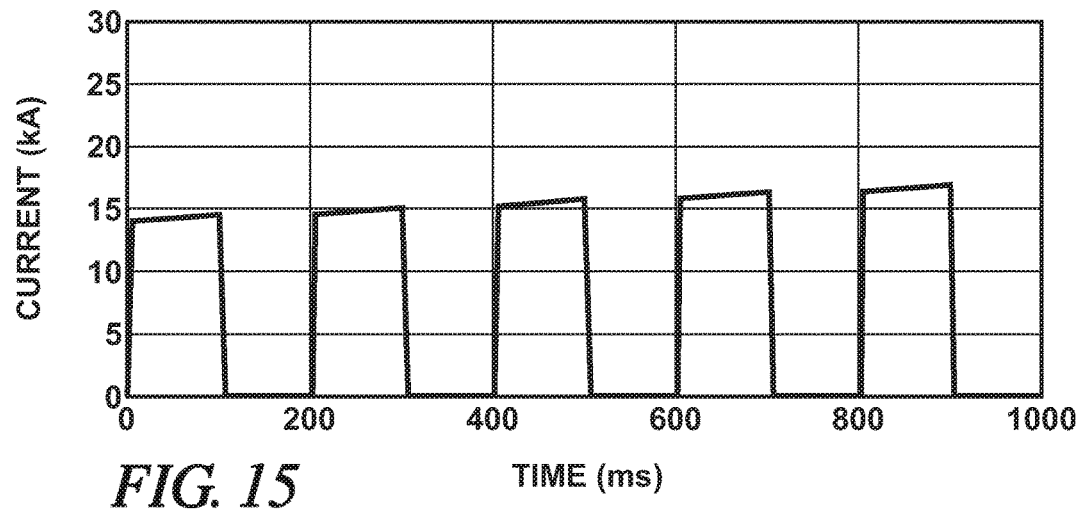
FIG. 15 is a graphical depiction of still another particular embodiment of the multi-stage spot welding method as represented by a weld schedule that shows how electrical current is passed between the welding electrodes.

In this example, which corresponds to FIG. 15, a 0.8-mm thick X626-T4 aluminum alloy workpiece was spot welded to a 1.2-mm thick hot-dip galvanized steel workpiece by the multi-stage spot welding method under 800 lb of force applied by the spot welding electrodes until the conclusion of the last weld joint refining stage. Here, in the weld joint origination stage, as shown, electrical current was passed through the workpieces at a current level that increased linearly from 14.02 kA to 14.6 kA over a first period of 100 ms to create a molten aluminum weld pool within the aluminum workpiece. Passage of electrical current was then ceased for a second period of 100 ms to solidify the molten aluminum weld pool into a weld joint. Next, four weld joint refining stages were executed. For each weld joint refining stage, the current level and magnitude of the electrical current passed between the electrodes to cause remelting, and the extent and duration to which the current level of the electrical current was dropped to allow for resolidification, are set forth below in Table 3. The peel strength of the refined weld joint obtained from the method was measured at 301 N.

TABLE 3

Details of Weld Joint Refining Stages in Example 3

| | Remelting | | Resolidifying | |
|---|---|---|---|---|
| Stage # | Current Level (kA) | Duration (ms) | Current Level (kA) | Duration (ms) |
| 1 | 14.62-15.2 | 100 | 0 | 100 |
| 2 | 15.22-15.8 | 100 | 0 | 100 |
| 3 | 15.82-16.4 | 100 | 0 | 100 |
| 4 | 16.42-17 | 100 | 0 | 100 |

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of resistance spot welding a workpiece stack-up that includes a steel workpiece and an aluminum workpiece, the method comprising:
   (a) providing a workpiece stack-up that has a first side and a second side, the workpiece stack-up comprising a steel workpiece disposed adjacent to and overlapping an aluminum workpiece, the steel workpiece having a faying surface that contacts a faying surface of the aluminum workpiece to establish a faying interface between the workpieces;
   (b) passing an electrical current across the faying interface to cause melting of the aluminum workpiece and the formation of a molten aluminum weld pool within the aluminum workpiece that wets the faying surface of the steel workpiece;
   (c) allowing the molten aluminum weld pool to solidify into a weld joint that bonds the steel and aluminum workpieces together at the faying interface, the weld joint having an interfacial weld bond area joined with the faying surface of the steel workpiece;
   (d) passing an electrical current through the weld joint to remelt at least a portion of the weld joint at the interfacial weld bond area to form a remelted portion of the weld joint;
   (e) allowing the remelted portion of the weld joint to resolidify to form a first refined weld joint; and
   (f) repeating steps (d) and (e) at least once to produce a final refined weld joint that bonds the steel and aluminum workpieces together at the faying interface.

2. The method set forth in claim 1, wherein the steel workpiece includes an exterior outer surface that provides the first side of the workpiece stack-up and the aluminum workpiece includes an exterior outer surface that provides the second side of the workpiece stack-up.

3. The method set forth in claim 1, wherein the workpiece stack-up further comprises an additional aluminum workpiece disposed adjacent to the aluminum workpiece or an additional steel workpiece disposed adjacent to the steel workpiece.

4. The method set forth in claim 1, wherein the aluminum workpiece comprises a base aluminum substrate comprised of elemental aluminum, an aluminum-magnesium alloy, an aluminum-silicon alloy, an aluminum-magnesium-silicon alloy, or an aluminum-zinc alloy.

5. The method set forth in claim 1, wherein step (b) comprises passing a direct electrical current across the faying interface, the direct electrical current having a current level that falls between 12 kA and 30 kA and is passed for a period of time that ranges from 50 ms and 500 ms.

6. The method set forth in claim 5, wherein step (c) comprises ceasing current flow across the faying interface for a time period of 20 ms to 500 ms after passage of the direct electrical current in step (b).

7. The method set forth in claim 6, wherein step (d) comprises passing a direct electrical current through the weld joint, the direct electrical current having a current level that falls between 15 kA and 30 kA and is passed for a period of time that ranges from 30 ms and 300 ms, and wherein step (e) comprises ceasing current flow for a time period of 20 ms to 500 ms after passage of the direct electrical current in step (d).

8. The method set forth in claim 1, wherein step (f) includes repeating steps (d) and (e) and additional one to fourteen times.

9. The method set forth in claim 1, wherein the workpiece stack-up further comprises an intermediate organic material layer between the faying surface of the steel workpiece and the faying surface of the aluminum workpiece at the faying interface.

10. The method set forth in claim 1, wherein the final refined weld joint includes an interfacial weld bond area bonded to the faying surface of the steel workpiece, and wherein the interfacial weld bond area of the final refined weld joint is greater in surface area than the interfacial weld bond area of the weld joint formed in steps (b) and (c).

11. The method set forth in claim 1, wherein the remelted portion of the weld joint consumes at least 50% of the interfacial weld bond area of the weld joint.

12. A method of resistance spot welding a workpiece stack-up that includes a steel workpiece and an aluminum workpiece, the method comprising:
   providing a workpiece stack-up that has a first side and a second side, the workpiece stack-up comprising a steel workpiece disposed adjacent to and overlapping an aluminum workpiece, the steel workpiece having a faying surface that contacts a faying surface of the aluminum workpiece to establish a faying interface between the workpieces;
   bringing a weld face of a first welding electrode and a weld face of a second welding electrode into pressed contact with the first side and the second side of the workpiece stack-up, respectively, the weld face of the first welding electrode and the weld face of the second welding electrode being facially aligned with one another at a weld site when brought into pressed contact with their respective sides of the workpiece stack-up;
   resistance spot welding the steel workpiece and the aluminum workpiece together at their faying interface by heating and cooling the weld site in multiple successive stages, each of the multiple successive stages of heating and cooling the weld site comprising passing an electrical current between the first and second welding electrodes and through the weld site at a current level within a working current level range of 10 kA to 40 kA for a duration of 10 ms to 1000 ms to generate heat within the weld site, followed by reducing the current level of the electrical current to within a reduced current level range of 0 kA to 5 kA for a duration of 10 ms to 1000 ms to allow the weld site to cool, and wherein the multiple successive stages of heating and cooling the weld site includes at least:
      a weld joint origination stage in which a weld joint is initially formed that joins the steel and aluminum workpieces together at the faying interface, the weld joint extending into the aluminum workpiece and having an interfacial weld bond area adjacent to and joined with a faying surface of the steel workpiece at the faying interface;
      a first weld joint refining stage in which at least a portion of the weld joint formed in the weld joint origination stage is remelted and resolidified into a first refined weld joint, wherein remelting of at least a portion of the weld joint produces a remelted portion of the weld joint that encompasses at least 50% of the interfacial weld bond area of the weld joint;
      a second weld joint refining stage in which at least a portion of the first refined weld joint formed in the first weld joint refining stage is remelted and resolidified into a second refined weld joint, wherein remelting of at least a portion of the first refined weld joint produces a remelted portion of the first refined weld joint that encompasses at least 50% of an interfacial weld bond area of the first refined weld joint; and removing the first welding electrode and the second welding electrode from pressed contact with the first side and the second side of the workpiece stack-up, respectively, after resistance spot welding of the steel and aluminum workpieces.

13. The method set forth in claim 12, wherein the workpiece stack-up further comprises an intermediate organic material layer between the faying surface of the steel workpiece and the faying surface of the aluminum workpiece at the faying interface, the intermediate organic material layer having a thickness between the faying surfaces of the steel and aluminum workpieces that ranges from 0.1 mm to 2.0 mm.

14. The method set forth in claim 13, wherein the intermediate organic material layer is an uncured, heat-curable adhesive that comprises a heat-curable epoxy.

15. The method set forth in claim 12, wherein the multiple successive stages of heating and cooling the weld site further includes:

a third weld joint refining stage in which at least a portion of the second refined weld joint formed in the second weld joint refining stage is remelted and resolidified into a third refined weld joint, wherein remelting of at least a portion of the second refined weld joint produces a remelted portion of the second refined weld joint that encompasses at least 50% of an interfacial weld bond area of the second refined weld joint.

16. The method set forth in claim 12, wherein, in the first weld joint refining stage, the remelted portion of the weld joint consumes the entirety of the weld joint initially formed in the weld joint origination stage including the entire interfacial weld bond area of the weld joint.

17. A method of resistance spot welding a workpiece stack-up that includes a steel workpiece and an aluminum workpiece, the method comprising:

providing a workpiece stack-up that comprises a steel workpiece and an aluminum workpiece disposed adjacent to and overlapping the steel workpiece, the steel workpiece having a faying surface that contacts a faying surface of the aluminum workpiece to establish a faying interface between the adjacent workpieces;

forming initially a weld joint between the steel workpiece and the aluminum workpiece, the weld joint extending from the faying surface of the steel workpiece into the aluminum workpiece and having an interfacial weld bond area adjacent to and joined with to the faying surface of the steel workpiece;

remelting and resolidifying at least a portion of the weld joint at the interfacial weld bond area without causing interfacial expulsion along the faying interface established between the steel workpiece and the aluminum workpiece, the remelting and resolidifying forming a first refined weld joint that includes remelted and resolidified material from the weld joint and any portions of the weld joint that did not undergo remelting and resolidification; and remelting and resolidifying at least a portion of the first refined weld joint at an interfacial weld bond area of the first refined weld joint without causing interfacial expulsion along the faying interface established between the steel workpiece and the aluminum workpiece, the remelting and resolidifying forming a second refined weld joint that includes remelted and resolidified material from the first refined weld joint and any portions of the first refined weld joint that did not undergo remelting and resolidification.

18. The method set forth in claim 17, wherein forming the weld joint comprises:

passing a direct electrical current across the faying interface and between a pair of welding electrodes that are pressed against opposite sides of the workpiece stack-up, the direct electrical current having a current level that falls between 12 kA and 30 kA and is passed for a period of time that ranges from 50 ms and 500 ms; and ceasing current flow across the faying interface and between the pair of welding electrodes for a time period of 20 ms to 500 ms after passage of the direct electrical current.

19. The method set forth in claim 18, wherein remelting and resolidifying the initially formed weld joint and the first refined weld joint comprises:

passing a direct electrical current between the pair of welding electrodes and through the weld site at a current level within a working current level range of 15 kA to 30 kA for a duration of 30 ms to 300 ms to generate heat within the weld site; and reducing the current level of the electrical current to within a reduced current level range of 0 kA to 2 kA for a duration of 20 ms to 500 ms to allow the weld site to cool.

20. The method set forth in claim 17, further comprising:

remelting and resolidifying at least a portion of the second refined weld joint at an interfacial weld bond area of the second refined weld joint without causing interfacial expulsion along the faying interface established between the steel workpiece and the aluminum workpiece, followed by remelting and resolidifying at least a portion of any subsequently formed refined weld joints at an interfacial weld bond area of those subsequently formed refined weld joints in order to produce a final refined weld joint between the steel workpiece and the aluminum workpiece, and wherein remelting and resolidifying is performed a total of one to fifteen times following initial formation of the weld joint.

* * * * *